US008312325B2

(12) United States Patent
Suzuki et al.

(10) Patent No.: US 8,312,325 B2
(45) Date of Patent: Nov. 13, 2012

(54) STORAGE SYSTEM THAT FINDS OCCURRENCE OF POWER SOURCE FAILURE

(75) Inventors: Hiroshi Suzuki, Sagamihara (JP); Tsutomu Koga, Matsuda (JP); Tetsuya Inoue, Odawara (JP); Tomokazu Yokoyama, Fujisawa (JP); Kenji Jin, Yokohama (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 13/227,639

(22) Filed: Sep. 8, 2011

(65) Prior Publication Data
US 2011/0320886 A1 Dec. 29, 2011

Related U.S. Application Data

(63) Continuation of application No. 12/869,260, filed on Aug. 26, 2010, now Pat. No. 8,037,362, which is a continuation of application No. 12/068,205, filed on Feb. 4, 2008, now Pat. No. 7,809,983.

(30) Foreign Application Priority Data

Sep. 4, 2007 (JP) .................................. 2007-228816

(51) Int. Cl.
*G06F 11/00* (2006.01)
(52) U.S. Cl. ................ 714/42; 714/14; 714/22; 714/25; 714/43
(58) Field of Classification Search ..................... 714/25, 714/43, 14, 22, 42
See application file for complete search history.

(56) References Cited

U.S. PATENT DOCUMENTS

| 6,754,171 | B1 * | 6/2004 | Bernier et al. ................ 370/216 |
| 7,111,087 | B2 | 9/2006 | Jiang et al. |
| 7,321,981 | B1 * | 1/2008 | Muntz ............................. 714/4.3 |
| 7,496,252 | B1 * | 2/2009 | Corbalis et al. ................. 385/16 |
| 2002/0152320 | A1 * | 10/2002 | Lau ................................ 709/238 |
| 2003/0217300 | A1 | 11/2003 | Fukumori et al. |
| 2004/0078663 | A1 | 4/2004 | Inaba |
| 2005/0188247 | A1 * | 8/2005 | Abe et al. ........................... 714/5 |
| 2005/0278581 | A1 | 12/2005 | Jiang et al. |
| 2006/0031709 | A1 | 2/2006 | Hiraiwa et al. |
| 2006/0047908 | A1 | 3/2006 | Chikusa et al. |
| 2006/0048018 | A1 * | 3/2006 | Hosoya et al. ................... 714/48 |
| 2006/0136688 | A1 * | 6/2006 | Pang et al. ...................... 711/162 |
| 2006/0190747 | A1 * | 8/2006 | Fukumori ...................... 713/300 |
| 2006/0193073 | A1 | 8/2006 | Hakamata et al. |
| 2006/0195624 | A1 * | 8/2006 | Chikusa et al. .................... 710/5 |

(Continued)

FOREIGN PATENT DOCUMENTS

JP 2001-027972 A 1/2001
(Continued)

*Primary Examiner* — Chae Ko
(74) *Attorney, Agent, or Firm* — Volpe and Koenig, P.C.

(57) ABSTRACT

One or more switches are interposed between a controller portion and a storage device. When transmission of a command to a certain storage device fails, a command is transmitted starting from an upstream side to a downstream side of a path between the controller portion and the switch to which the certain storage device is connected, and when command transmission fails while transmitting a command from a $k^{th}$ switch (k is an integer of 0 or more) which is connected to a $(k+1)^{th}$ switch and is one level upstream of the $(k+1)^{th}$ switch or from any port of the controller portion, it is determined that a failure has occurred in a power source that supplies power to the $(k+1)^{th}$ switch.

20 Claims, 13 Drawing Sheets

U.S. PATENT DOCUMENTS

| | | | |
|---|---|---|---|
| 2007/0067462 A1* | 3/2007 | Takeda | 709/227 |
| 2007/0070885 A1* | 3/2007 | Uddenberg et al. | 370/225 |
| 2007/0294572 A1* | 12/2007 | Kalwitz et al. | 714/9 |
| 2008/0201548 A1* | 8/2008 | Przybylski et al. | 711/171 |
| 2009/0013215 A1 | 1/2009 | Kakihara et al. | |

FOREIGN PATENT DOCUMENTS

| | | |
|---|---|---|
| JP | 2006-048578 A | 2/2006 |
| JP | 2006-072636 A | 3/2006 |
| JP | 2006-126972 | 5/2006 |
| JP | 2006-285519 A | 10/2006 |

* cited by examiner

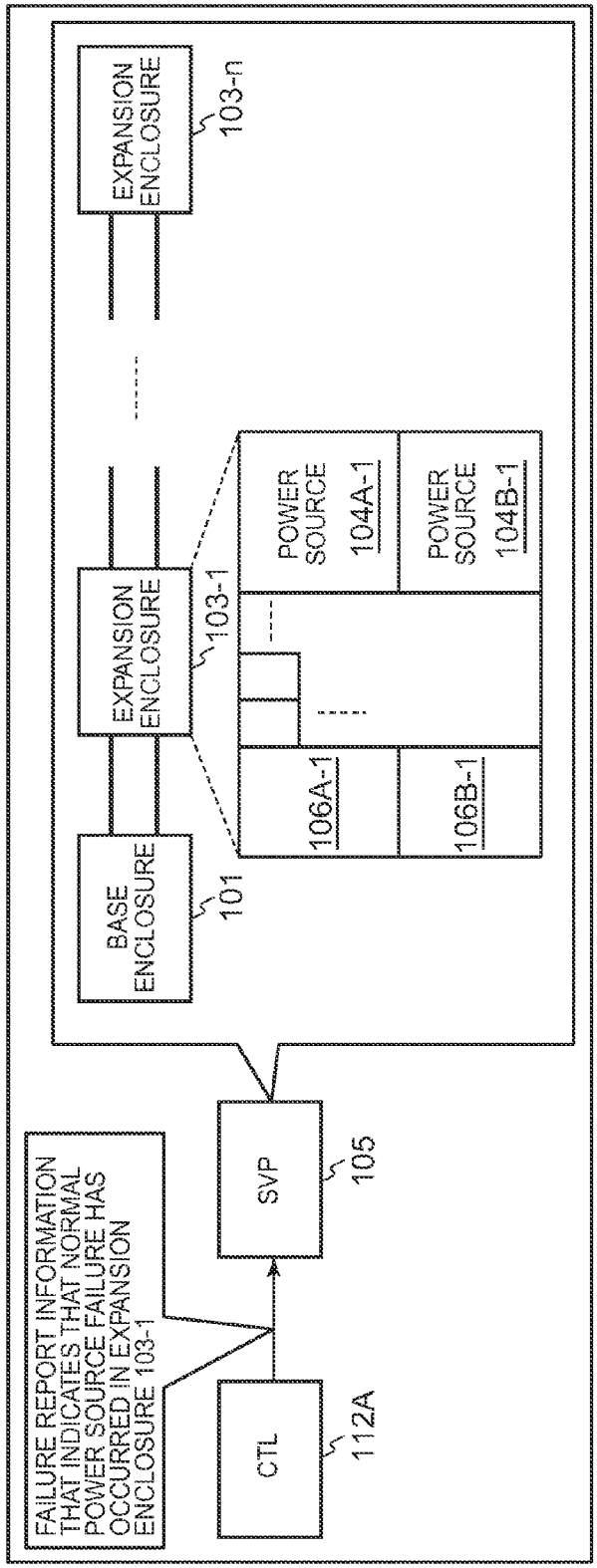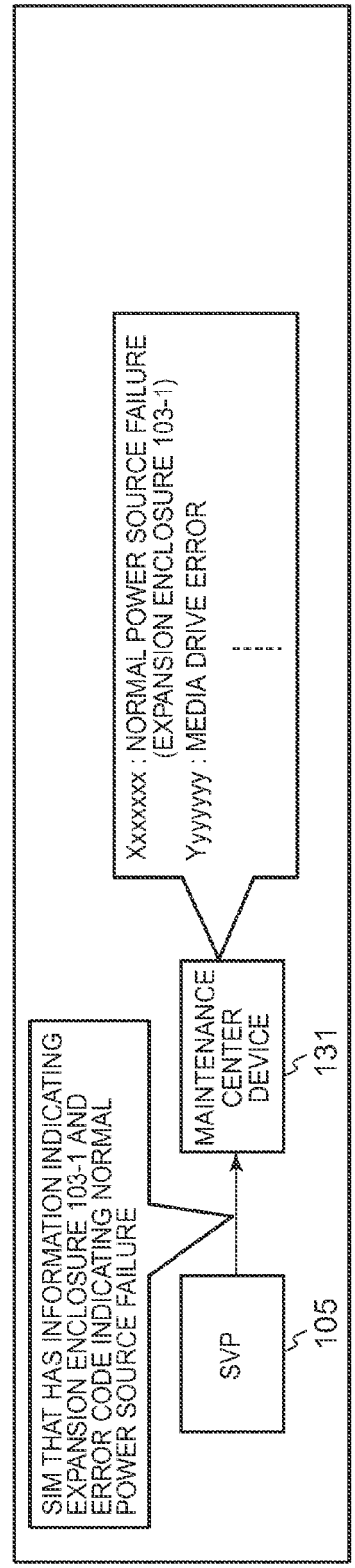

STORAGE SYSTEM THAT FINDS OCCURRENCE OF POWER SOURCE FAILURE

CROSS-REFERENCES TO RELATED APPLICATIONS

This application is a continuation of U.S. patent application Ser. No. 12/869,260, filed Aug. 26, 2010, which is a continuation of U.S. patent application Ser. No. 12/068,205, filed on Feb. 4, 2008, which claims the benefit of Japanese Patent Application number 2007-228816, filed on Sep. 4, 2007, each of which is incorporated by reference as if fully set forth herein.

BACKGROUND

The present invention generally relates to finding of a power source failure that occurs in a storage system.

The technology disclosed in, for example, Japanese Published Unexamined Patent Application No. 2006-126972 is known as the technology related to finding of a power source failure in a storage system. According to the technology described in Japanese Published Unexamined Patent Application No. 2006-126972, the power source monitoring portion of the HDD (hard disk drive) detects the occurrence of a failure in the power source of the HDD, and the power source monitoring portion informs a control portion within the storage system of the failure.

As the configuration of the storage system, for example, there is sometimes adopted a configuration in which one or more units equipped with a plurality of media drives (referred to as "expansion enclosures" hereinafter for convenience) are connected in series to a unit having a controller (referred to as "base enclosure" hereinafter for convenience) via components such as cables or backboards. In other words, there is adopted a configuration in which a base enclosure and one or more expansion enclosures are connected in multi-stages. According to this type of configuration, the storage capacity of the storage system can be changed by changing the number of expansion enclosures.

As this type of storage system, there is, for example, a storage system having a configuration shown in FIG. 1.

For example, n number of expansion enclosures 3-1 through 3-n (n is an integer of 1 or more (in the illustrated example, n is an integer of 2 or more)) are connected to a base enclosure 10.

The base enclosure 10 has duplex controllers (abbreviated as "CTL" hereinafter) 1A and 1B. The CTLs 1A and 1B have drive I/F control circuits 2A and 2B respectively. The drive I/F control circuit 2A controls drive I/F circuits 6A-1 through 6A-n and the drive I/F control circuit 2B controls drive I/F circuits 6B-1 through 6B-n. For example, the drive I/F control circuits 2A and 2B control a drive I/F circuit (6A-1, for example) to which a target media drive (8-1-0, for example) is connected, and thereby access this media drive.

The expansion enclosure 3-n has duplex AC/DC power sources (simply referred to as "power sources" hereinafter) 4A-n and 4B-n, duplex drive control boards 5A-n and 5B-n, and m+1 number of media drives 8-n-0 through 8-n-m (m is an integer of 0 or more (in the illustrated example, m is an integer of 1 or more)). The drive control boards 5A-n and 5B-n have, respectively, the drive I/F circuits 6A-n and 6B-n, which are interface circuits for the media drives 8-n-0 through 8-n-m. The media drives 8-n-0 through 8-n-m are connected to each of the drive I/F circuits 6A-n and 6B-n. The power sources 4A-n and 4B-n convert AC power supplied from AC power sources (commercial power sources) 7A-n and 7B-n respectively into DC power and then supply the DC power to the drive I/F circuits 6A-n and 6B-n, and media drives 8-n-0 through 8-n-m.

The drive I/F control circuit 2A (and 2B) of the base enclosure 10 is connected in series to the drive I/F circuits 6A-1 through 6A-n (and 6B-1 through 6B-n) of the respective expansion enclosures 3-1 through 3-n via fiber channel cables 11A-1 through 11A-n (and 11B-1 through 11B-n). Accordingly, a fiber channel signal line 11A (and 11B) is formed (specifically, for example, an FC-AL (Fiber Channel-Arbitrated Loop) having the drive I/F circuits 6A-1 through 6A-n (and 6B-1 through 6B-n) and the fiber channel cables 11A-1 through 11A-n (and 11B-1 through 11B-n) is configured).

In this type of storage system, when a failure occurs in the power sources 4A-1 through 4A-n and 4B-1 through 4B-n of the expansion enclosures 3-1 through 3-n, it is demanded that the failure is detected and a report thereof is output.

The following method can be considered as a method for realizing such detection and output.

Specifically, as shown in FIG. 1, in the expansion enclosures 3-1 through 3-n the drive control boards 5A-1 through 5A-n and 5B-1 through 5B-n are provided respectively with power source abnormality detection circuits 9A-1 through 9A-n and 9B-1 through 9B-n that monitor voltage of power wires 15-1 through 15-n. In the expansion enclosure 3-n, for example, the power source abnormality detection circuits 9A-n and 9B-n are supplied with power from the power sources 4A-n and 4B-n respectively. The power source abnormality detection circuits 9A-1 through 9A-n and 9B-1 and 9B-n are connected respectively to the drive I/F control circuits 2A and 2B via cables 13A-1 through 13A-n and 13B-1 through 13B-n in which signals indicating a power source failure flow ("power source abnormality informing cable" hereinafter). In the expansion enclosure 3-n, for example, when a failure occurs in both the power sources 4A-n and 4B-n, the power source abnormality detection circuits 9A-n and 9B-n detect the abnormality of the power sources 4A-n and 4B-n (decrease of voltage in the power wire 15-n), and transmit the signals indicating the power source abnormality to the drive I/F control circuits 2A and 2B, respectively, via the power source abnormality reporting cables 13A-n and 13B-n. When both the drive I/F control circuits 2A and 2B receive the signals indicating the power source abnormality from the power source abnormality detection circuits 9A-n and 9B-n respectively, the occurrence of power source failures, which are failures of both the power source abnormality detection circuits 9A-n and 9B-n, is found.

However, according to this configuration, the following problems arise.

(1) The power source abnormality reporting cable is required in each drive I/F circuit. For this reason, it is difficult to form wiring within the storage system. Furthermore, the greater the number of levels of the drive I/F circuits, the longer the distance between the controller and the drive I/F circuit at the end, and, since the there are a large number of power source abnormality reporting cables, a high-performance circuit might be required in the controller in order to receive a report on a power source failure.

(2) The power source abnormality detection circuit is required in each drive I/F circuit. Power consumption is high due to the provision of the power source abnormality detection circuits.

(3) As described above, the power source abnormality reporting cable and the power source abnormality detection circuit are required in each drive I/F circuit. For this reason, the number of parts increases as the number of the cables and circuits increases, whereby the number of targets to be maintained (or inspected, for example) is increased.

SUMMARY

It is therefore an object of the present invention to be able to find the occurrence of a power source failure in each drive I/F circuit by means of a controller portion even if the drive I/F circuit does not have the power source abnormality detection circuit or power source abnormality reporting cable.

Another object of the present invention will become clear from the following descriptions.

One or more switches are interposed between a controller portion and a storage device. When transmission of a command to a certain storage device fails, a command is transmitted from an upstream side to a downstream side in a path between the controller portion and the switch to which this storage device is connected (the upstream side is on the side near the controller portion). When command transmission fails while transmitting a command from a kth switch (k is an integer of 0 or more) which is connected to a (k+1)th switch and is one level upstream of the (k+1)th switch or from any of the ports of the controller portion, it is determined that a failure has occurred at a power source that supplies power to the (k+1)th switch.

BRIEF DESCRIPTION OF THE DRAWINGS

FIG. 4A shows examples of transmission of failure report information from a controller to a SVP and of a screen that is displayed by the SVP on the basis of the failure report information;

FIG. 4B shows examples of transmission of information from the SVP to a maintenance center device and of information that is output by the maintenance center device on the basis of the information;

DETAILED DESCRIPTION OF THE PREFERRED EMBODIMENT

Figure 1:
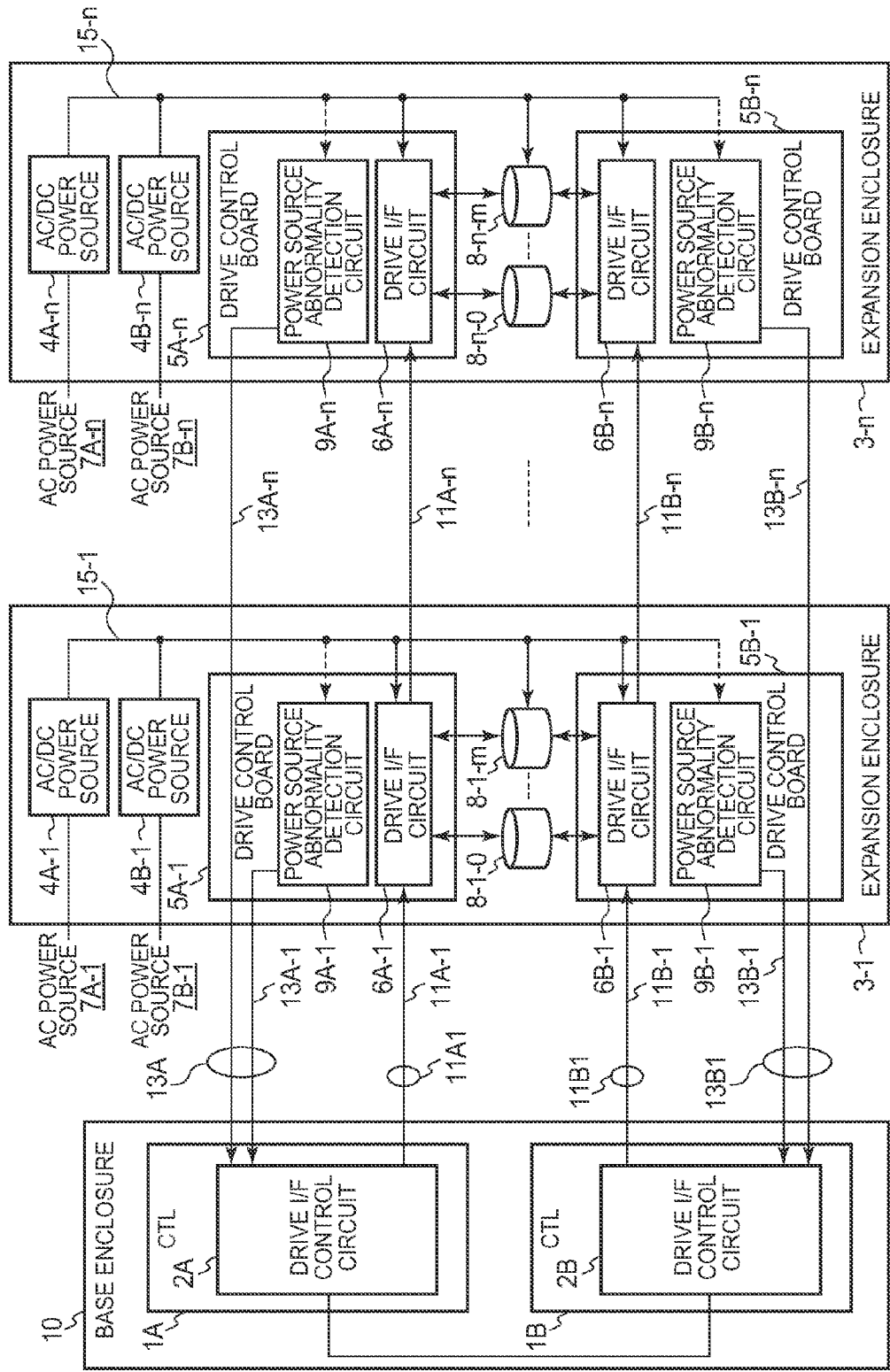
FIG. 1 shows an example of the configuration of a storage system in which a base enclosure is connected in series to one or more expansion enclosures by means of an FC-AL.

In Embodiment 1, a storage system has one or more switches, a controller portion, two or more storage devices, and one or more power sources that supply power to the one or more switches. The controller portion has two or more ports that are connected respectively via two or more links to two or more ports of at least one of the one or more switches. The two or more storage devices are connected to the two or more ports out of a plurality of ports of the one or more switches. When transmission of a command to a storage device selected from among the two or more storage devices fails, the controller portion transmits a command, starting from an upstream side to a downstream side of a path between the controller portion and the switch to which the selected storage device is connected. When command transmission fails while transmitting a command from a kth switch (k is an integer of 0 or more) which is connected to a (k+1)th switch and is connected one level upstream of the (k+1)th switch or from any of the ports of the controller portion, the controller portion determines that a failure has occurred in a power source that supplies power to the (k+1)th switch.

In Embodiment 2, according to Embodiment 1, the controller portion has a first controller having a first sub-controller, and a second controller having a second sub-controller. The one or more switches have n number of first switches (n is an integer of 1 or more, n (k+1)) that are connected to the first sub-controller in the form of a cascade, and n number of second switches that are connected to the second sub-controller in the form of a cascade. Each of the power sources supplies power to one or more pairs of the first and second switches. When command transmission fails even when using a kth first switch which is connected to the (k+1)th switch and is one level upstream of the (k+1)th switch or using any port of the first sub-controller in a first path between the first sub-controller and the first switch to which the selected storage device is connected, the second controller transmits a command from a kth second switch or the second sub-controller to a (k+1)th second switch in a second path between the second sub-controller and the second switch to which the selected storage device is connected. When transmission of a command from the kth second switch or any port of the second sub-controller fails (for example, when the links cannot be ensured or when no response is returned within a certain period of time even when the links are ensured to perform command transmission), the first or second controller determines that a failure has occurred in the power sources that supply power to the (k+1)th first and second switches. When transmission of a command from the kth second switch or any port of the second sub-controller succeeds (for example, when a response is returned within a certain period of time after the links are secured to perform command transmission), the first or second controller determines that a failure related to a (k+1)th link on the first path has occurred.

In Embodiment 3, according to Embodiment 2, after transmission of a command from the kth second switch or any port of the second sub-controller fails, the first controller transmits a command toward the (k+1)th first switch or a first switch at a stage posterior to the (k+1)th first switch, and when the command transmission succeeds, the first controller determines that a failure has occurred temporarily in the power sources that supply power to the (k+1)th first and second switches.

In Embodiment 4, according to Embodiment 3, when transmission of a command toward the (k+1)th first switch or the first switch posterior to the (k+1)th first switch succeeds, the first controller executes initialization of the first sub-controller.

In Embodiment 5, according to at least one of Embodiments 2 through 4, after transmission of a command from the kth second switch or any port of the second sub-controller fails, the first controller transmits a command toward the (k+1)th first switch or the first switch posterior to the (k+1)th first switch. When the command transmission fails, the second controller transmits a command toward the (k+1)th second switch or the second switch posterior to the (k+1)th second switch. When the command transmission fails, the first or second controller determines that a failure has occurred in the power sources that supply power to the (k+1)th first and second switches.

In Embodiment 6, according to Embodiment 5, when transmission of a command toward the (k+1)th second switch or the second switch posterior to the (k+1)th second switch fails, the first or second controller determines that a failure related to a (k+1)th link has occurred.

In Embodiment 7, according to at least one of Embodiments 2 through 6, the one or more switches have n number of third switches that are connected to the first sub-controller in the form of a cascade, and n number of fourth switches that are connected to the second sub-controller in the form of a cascade. The plurality of power sources have a first power source for supplying power to one or more pairs of the first and second switches, and a second power source for supplying power to one or more pairs of the third and fourth switches. When command transmission fails even when using a kth third switch which is connected to (k+1)th switch and is one level upstream of the (k+1)th switch or using any port of the first sub-controller in a third path between the first sub-controller and the third switch to which the selected storage device is connected, the second controller transmits a command from a kth fourth switch or the second sub-controller to a (k+1)th fourth switch in a fourth path between the second sub-controller and the fourth switch to which the selected storage device is connected. When transmission of a command from the kth fourth switch or any port of the second sub-controller fails, the first or second controller determines that a failure has occurred in the second power source that supplies power to the (k+1)th third and fourth switches. When transmission of a command from the kth third switch or any port of the second sub-controller succeeds, the first or second controller determines that a failure related to a (k+1)th link on the third path has occurred.

In Embodiment 8, according to at least one of Embodiments 2 through 7, the storage system further has a shared memory that is shared by the first and second controllers. The first and second controllers have first and second processors respectively, and the first and second processors are connected to the first and second sub-controllers respectively. Either one of the first and second processors that is judged to have a power source failure writes power source failure information indicating the occurrence of a power source failure into the shared memory. When transmission of a command to the selected storage device fails, if the power source failure information is stored in the shared memory, then the first processor does not transmit a command, starting from an upstream side to a downstream side of a path between the first sub-controller and the switch to which the selected storage device is connected.

In Embodiment 9, according to at least one of Embodiments 2 through 8, each of the sub-controllers is a SAS (Serial Attached SCSI) controller, each of the ports is a phy, and each of the switches is a SAS expander.

In Embodiment 10, according to Embodiment 9, one narrow link, a two-wide port that is a collection of two narrow links, and a four-wide port that is a collection of four narrow links connect the first SAS controller to the first SAS expander, the first SAS expanders to each other, the second SAS controller to the second SAS expander, and the second SAS expanders to each other.

In Embodiment 11, according to Embodiment 1, when transmission of a command from the kth switch or any of the ports of the controller portion succeeds, the controller portion determines that a failure related to a (k+1)th link has occurred.

In Embodiment 12, according to at least one of Embodiments 1 through 11, even when a failure occurs in a certain storage device out of the two or more storage devices, an interface, via which an access can be made from the controller portion to another storage device, connects the controller portion to each of the storage devices so that the control portion and each of the storage devices can communicate with each other by each of the switches.

In Embodiment 13, according to at least one of Embodiments 2 through 10, the storage system is constituted by a base unit and an expansion unit that can be increased or decreased. The base unit has first and second controllers. Each of the expansion units has one or more pairs of first and second expanders, one or more power sources that supply power to the one or more pairs of first and second expanders, and two or more storage devices that are connected to both the first and second expanders.

Two or more embodiments out of the above-described Embodiments 1 through 13 may be combined.

A storage system that requires neither a power source abnormality detection circuit nor a power source abnormality reporting cable is constructed. Specifically, for example, two storage device control boards (e.g., drive control boards), each of which has a switch (e.g., a SAS interface circuit (a SAS expander as a specific example)), are connected to two or more storage devices, each of which has two ports. Power sources (e.g., a pair of power sources configured by multi-plexed power sources) for supplying power to the switches or storage devices are connected to these storage device control boards. Such elements are provided in each expansion unit that is a unit of expansion or contraction. The expansion units are connected in one or more levels to the base unit having the controller portion. A plurality of signal paths are constructed in the storage system, and the controller portion uses each of the signal paths to determine whether a failure has occurred in each signal path or whether a power source failure has occurred. Furthermore, when it is possible to restore a circuit to which the switches are connected in the controller portion (e.g., a SAS controller described hereinafter), automatic restoration is performed.

Accordingly, wirings can be easily formed in each expansion unit. Also, power consumption in the expansion unit can be reduced. Furthermore, the number of parts in the expansion unit is reduced, whereby the number of objects to be maintained is reduced.

Several embodiments of the present invention will be described hereinafter in detail with reference to the drawings.

First Embodiment

Figure 2:
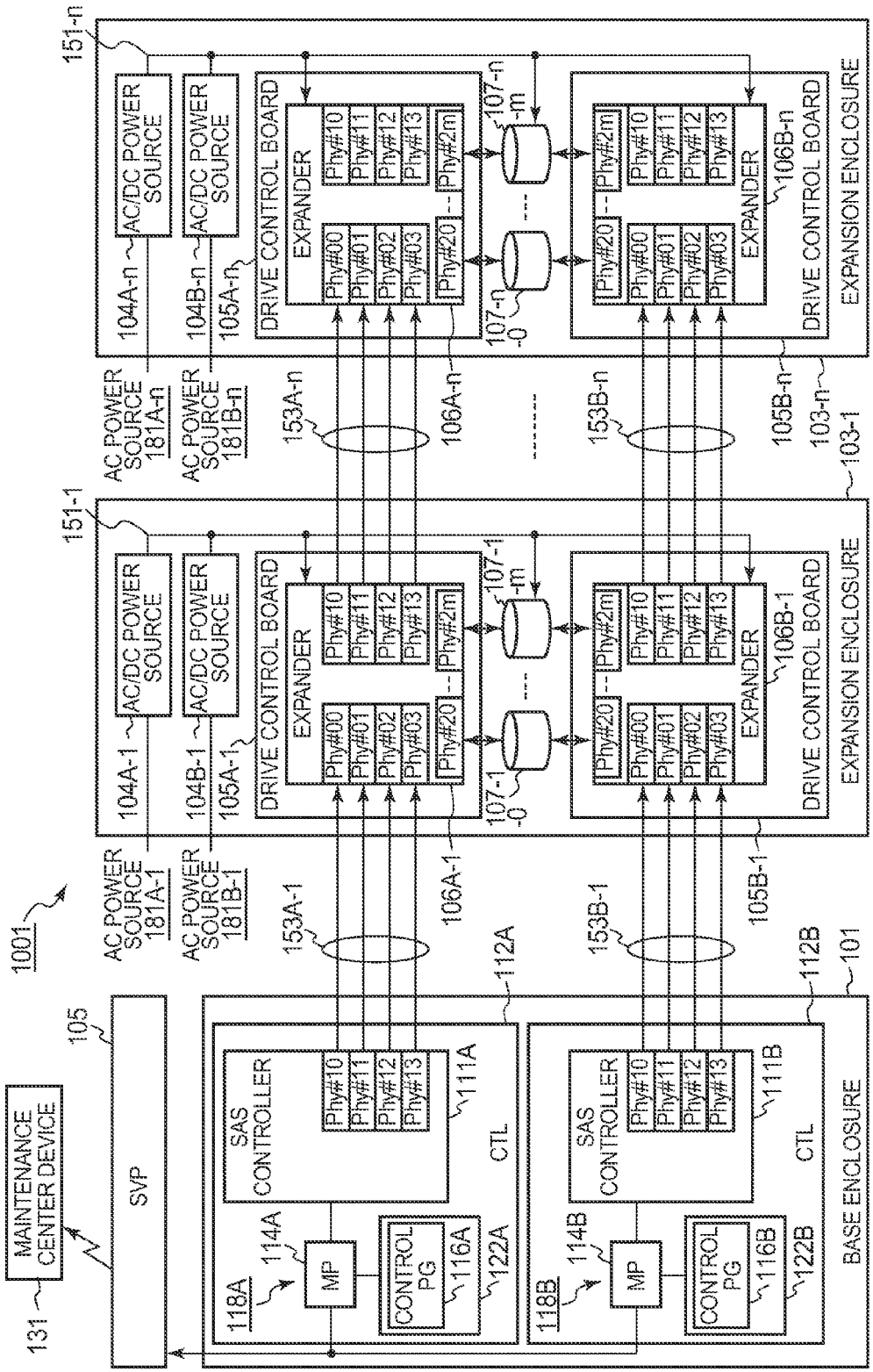
FIG. 2 shows an example of the configuration of a storage system according to a first embodiment of the present invention.

FIG. 2 shows an example of the configuration of a storage system according to a first embodiment of the present invention.

A storage system 1001 is constituted by a base enclosure 101 and n number of expansion enclosures 103-1 through 103-n (n is an integer of 1 or more (in the example shown in FIG. 2, n is an integer of 2 or more)). The n number of expansion enclosures 103-1 through 103-n are connected in series to the base enclosure 101.

The base enclosure 101 has duplex controllers ("CTL" hereinafter) 112A and 112B. The CTL 112A (and 112B) has, for example, a RAID control portion 118A (and 118B) and a SAS (Serial Attached SCSI) controller 111A (and 111B).

The RAID control portions 118A and 118B are modules that have, respectively, for example, microprocessors ("MP" hereinafter) 114A and 114B for executing a computer program and memories 122A and 122B for storing the computer program and the like, and execute command processing. Specifically, for example, the memories 122A and 122B of the respective RAID control portions 118A and 118B have stored therein information that indicates what RAID level of RAID group is constructed by two or more media drives and what kind of logical volume having an ID is formed in such a RAID group ("RAID configuration information" hereinafter). The MP 114A (and 114B) receives an I/O command ("volume I/O command" hereinafter) from an external device (a device existing outside the storage system 1001, such as a host computer or other storage system), specifies, based on the RAID configuration information, two or more media drives corresponding to a logical volume to be specified by the volume I/O command, in response to the volume I/O command, and generates two or more I/O commands corresponding respectively to the specified two or more media drives ("drive I/O commands" hereinafter). The MP 114A (and 114B) is connected communicably to the SAS controller 111A (and 111B) and instructs the SAS controller 111A (and 111B) to transmit each drive I/O command to a media drive that is the target of transmission of the drive I/O commands. The MP 114A (and 114B) is also connected to the other RAID control portion 118B (and 118A) and can instruct the other RAID control portion 118B (and 118A) to issue the drive I/O commands to the media drive.

The memory 122A (and 122B) has stored therein a control program 116A (and 116B) (in the drawing, "program" is abbreviated to "PG"). Hereinafter, when "computer program" is the subject of a description, processing is actually performed by a CPU that executes the computer program.

The SAS controller 111A (and 111B) is, for example, a hardware circuit (e.g., an IC chip). The SAS controller 111A (and 111B) transmits, in response to the instructions from the RAID control portions 118A and 118B, the drive I/O commands received from the RAID control portions 118A and 118B to a disk drive 111 specified by the drive I/O commands. The SAS controller 111A (and 111B) has a plurality of phys. The phys each are a physical port.

Each of the expansion enclosures is described by taking the expansion enclosure 103-n as an example. The expansion enclosure 103-n has duplex AC/DC power sources (simply referred to as "power sources" hereinafter) 104A-n and 104B-n, duplex drive control boards 105A-n and 105B-n, and m+1 number of media drives 107-n-0 through 107-n-m (m is an integer of 0 or more (in the illustrated example, m is an integer of 1 or more)). The drive control boards 105A-n and 105B-n have expanders 106A-n and 106B-n respectively.

The AC/DC power sources 104A-n and 104B-n are connected to AC power sources (commercial power sources) 181A-n and 181B-n respectively, convert alternate currents supplied from the AC power sources 181A-n and 181B-n respectively into direct currents having predetermined voltage value and current value, and then output the direct currents to a power wire 151-n. The power wire 151-n is connected to, for example, the expanders 106A-n and 106B-n or media drives 107-n-0 through 107-n-m. Therefore, power is supplied from the power sources 104A-n and 104B-n to the expanders 106A-n and 106B-n or media drives 107-n-0 through 107-n-m via the power wire 151-n.

The drive control boards 105A-n and 105B-n are circuit boards for controlling the media drives 107-n-0 through 107-n-m and have, for example, the expanders 106A-n and 106B-n, respectively.

The expanders 106A-n and 106B-n each are a SAS interface circuit, i.e., a switch device. The expanders 106A-n and 106B-n each have the plurality of phys. The plurality of phys include first phys that are connected to the phys of the proximal and upstream expander, second phys that are connected to the phys of the proximal and downstream expander, and third phys that are connected to the media drives 107-n-0 through 107-n-m. Hereinafter, these phys are distinguished by the numbers that are assigned respectively to the phys (for example, the phy having a phy number "00" is described as "phy#00"). Specifically, the first phys start with the phy number "0" (e.g., phy#00 through phy#03), the second phys are started with the phy number "1" (e.g., phy#10 through phy#13), and the third phys are started with the phy number "2" (e.g., phy#20 through phy#2m). Therefore, the numbers for the phys that are connected respectively to the phy#00 through phy#03 of the proximal and downstream expanders 106A-1 and 106B-1 also start with "1" (e.g., phy#10 through phy#13) in the SAS controllers 111A and 111B.

In the present embodiment, the phy#10 through phy#13 of the SAS controllers 111A and 111B are connected respectively to the phy#10 through phy#13 of the expanders 106A-1 and 106B-1 by four-wide links 153A-1 and 153B-1. Similarly, the phy#10 through phy#13 of the upstream expander are connected to the phy#00 through phy#03 of the downstream expander by the four-wide link. Consequently, a first SAS signal path connected to the SAS controller 111A (a path that is configured by the expanders 106A-1 through 106A-n connected in the form of a cascade and the four-wide links 153A-1 through 153A-n) and a second SAS signal path connected to the SAS controller 111B (a path that is configured by the expanders 106B-1 through 106B-n connected in the form of a cascade and the four-wide links 153B-1 through 153B-n) are constructed. It should be noted that the four-wide link is a collection of four narrow links connecting four-wide ports (a collection of four phys). A single narrow link is a physical link that connects one phy to another.

The phy#20 through phy#2m of the both expanders 106A-n and 106B-n are connected to the media drives 107-n-0 through 107-n-m, respectively. Each of the media drives 107-n-0 through 107-n-m is a storage device and is a drive for various storage media, such as a hard disk, a DVD (Digital Versatile Disk), and a flash memory. The media drives 107-n-0 through 107-n-m each are a drive equipped with a SATA (Serial Attached SCSI) or SAS interface. Specifically, each of the media drives 107-n-0 through 107-n-m has two ports. One of the two ports is connected to the phy#20 through phy#2m of one of the expanders, i.e., 106A-n, and the other port is connected to the phy#20 through phy#2m of the other expander, i.e., 106B-n. It should be noted that if each media drive has only one port, a port on one side of a dongle (interface converter) that has two ports on the other side is connected to this media drive so that a media drive having two ports is obtained.

When the abovementioned MP 114A (and 114B) finds the occurrence of a power source failure or other failure, the MP 114A transmits information on the type of the discovered failure or the location of the occurrence of the failure ("failure report information" hereinafter) to a SVP (Service Processor) 105. The SVP 105 is a device (a computer, for example) that has, for example, a storage resource, a microprocessor and a display device. The microprocessor of the SVP 105 accumulates the received failure report information in the storage resource (a memory and/or a media drive, for example), and causes the display device to display, based on the failure report information, the location of the occurrence of a failure and the type of the failure. Also, the microprocessor of the SVP 105 transmits, to a maintenance center device 131, information that has the information on the failure occurrence location or an error code indicating the type of the failure (hereinafter, "service information" is abbreviated to "SIM" for convenience), on the basis of the failure report information. The maintenance center device 131 is a device that collects the SIM from a plurality of SVPs corresponding to a plurality of storage systems (a server machine, for example). The maintenance center device 131 outputs, based on the collected SIM, information indicating where and what kind of failure occurred (for example, the maintenance center device 131 displays or transmits the collected SIM to a predetermined terminal via a LAN (Local Area Network) (in this case, this terminal displays the information)).

The above has described the configuration of the storage system 1001 according to the present embodiment.

A routing table is stored in the memory 122A (122B) of the RAID control portion 118A (118B), an unshown memory of the SAS controller 111A (111B), and unshown memories of the expanders 106A-1 through 106A-n (106B-1 through 106B-n). The routing table has recorded therein information elements indicating the destinations (destination information elements), for the devices existing downstream of a device having this table (the RAID control portion, SAS controller or expander that is referred to as "target device" hereinafter) and the devices that are connected directly (connected by a single narrow link) to the phys of the target device. The routing tables that are stored in the upstream devices have recorded therein a larger number of destination information elements, because the higher the device is located, the larger the number of lower devices are located. For this reason, the routing tables possessed by the RAID control portion 118A (and 118B) and SAS controller 111A (and 111B) have recorded therein the largest number of destination information elements (i.e., the destination information elements of all devices (expanders and media drives) on the lower side). The destination information element can be configured by, for example, the address according to the SAS standard (SAS address) of a device (an expander, for example) and the number for a phy. The control program 116A transmits a discovery command designating the phy of a desired expander, and thereby can acquire the destination information of a device connected to this phy.

Once the control program 116A executed by the MP 114A transmits a connection command that designates a target SAS address (e.g., a SAS address that is the target of transmission of the dive I/O commands) from a phy selected from among the four phys #10 through #13 of the SAS controller 111A, the narrow links are ensured sequentially from the upstream side toward the downstream side. Once the narrow links are ensured up to the target SAS address, a connection is established in the first SAS signal path. When a connection is established, the control program 116A transmits, for example, the drive I/O command as a desired command from the selected phy. Accordingly, data according to the drive I/O command is written to a target media drive via each of the ensured narrow links or read out from the target media drive via each of the ensured narrow links.

There are cases in which a failure related to the SAS signal paths ("SAS path failure" hereinafter) occurs in this series of flows. Examples of the SAS path failure include a drive access failure and a link failure. The drive access failure occurs when no response is returned even if a predetermined time elapses after issuance of the drive I/O commands, or when the written or read data is damaged (for example, when data detected in verification processing is discrepant). The link failure occurs when a connection is not established. The cause of the occurrence of the SAS path failure can be, for example, damaged narrow links, damaged phys to which the narrow links are connected, damaged expanders, and the like.

As described above, when the SAS path failure occurs, an access cannot be made from the SAS controller 111A to a desired target (e.g., an expander or a media drive) via the first SAS signal path.

However, the cause of this inaccessibility can be not only the SAS path failure but also a power source failure. For example, even if power is not supplied from either one of the power sources 104A-n and 104B-n, power is continuously supplied from the other power source so that the expanders 106A-n and 106B-n or the media drives 107-n-0 through 107-n-m can be activated. However, when a power source failure occurs (i.e., when power supply from the power sources 104A-n and 104B-n is stopped due to a blackout or the like), the operation of the expanders 106A-n and 106B-n or the media drives 107-n-0 through 107-n-m is stopped, because the power source for these devices are turned OFF (it should be noted that when the power source 104A-n and/or the power source 104B-n is down, they can be recovered by replacing them).

Figure 3:
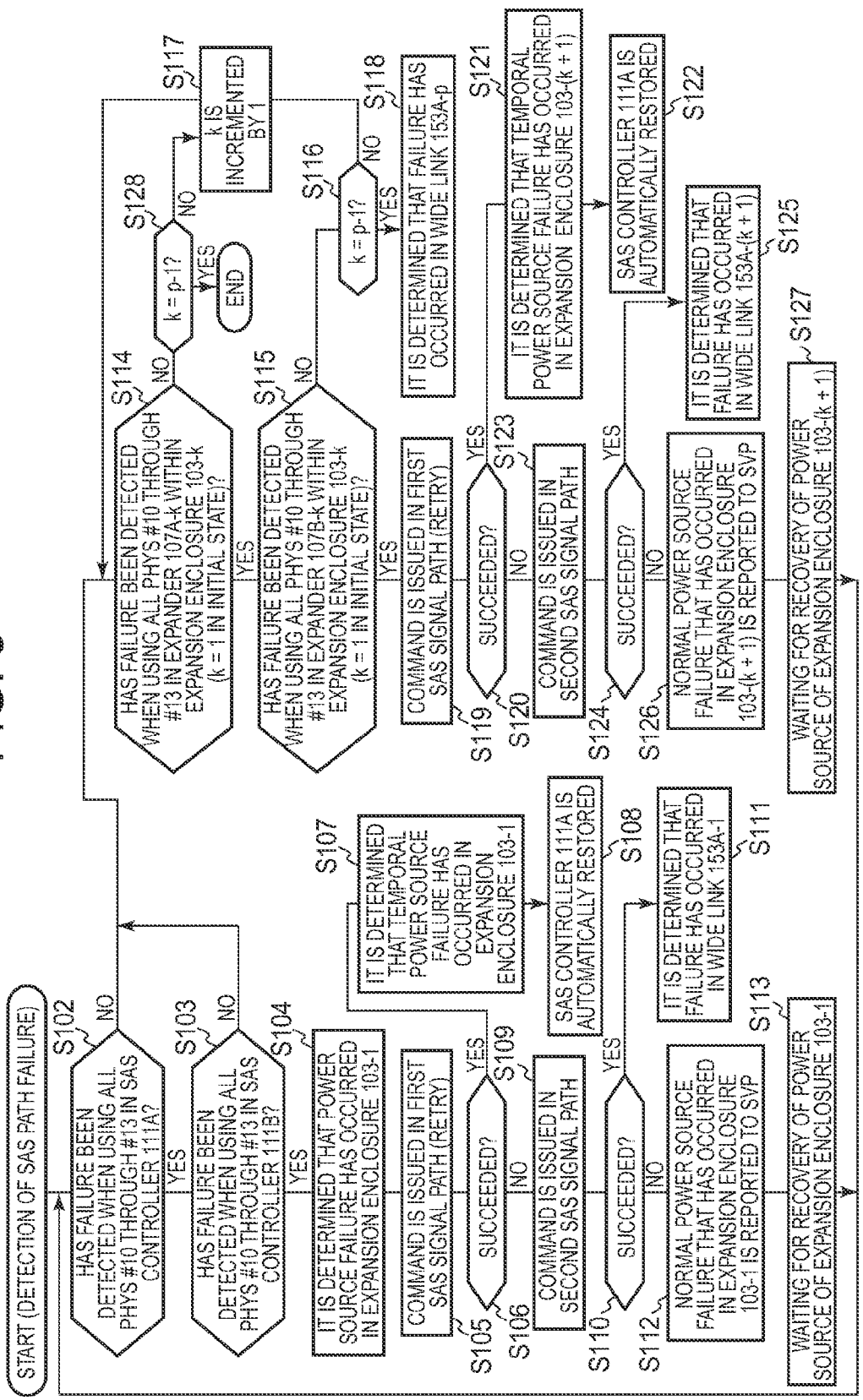
FIG. 3 shows a flow of failure check processing performed in the first embodiment of the present invention.

In the present embodiment, by performing the following failure check processing, which is devised focusing on the characteristics of the SAS, it is possible to determine whether the reason that the SAS path failure is detected is actually due to the occurrence of the SAS path failure or the occurrence of a power source failure. The failure check processing started by the detection of the SAS path failure in either one of the first and second SAS signal paths. Hereinafter, FIG. 3 is used to describe the failure check processing that is started by the detection of the SAS path failure (in the drawing, "step" is abbreviated to "S"). It should be noted in the following descriptions that the SAS path failure is detected when transmitting a command that is targeted to the media drives connected to an expander 106A-p in an expansion enclosure 103-p (p is an integer of n or lower). Moreover, in the following descriptions, the numbers indicating the levels of four-wide links or an expander (and/or the media drives connected to the expander) are expressed by an alphabet "k" (k is an integer of 1 or more). The alphabet k indicates at what level from the SAS controllers 111A and 111B the wide link or expander exists when the levels of the SAS controllers 111A and 111B located at the uppermost stream are 0 (in other words, k indicates the positions from the SAS controller 111A and 111B). For example, from the perspective of the first SAS signal path, k=1 indicates the four-wide link 153A-1 that connects the SAS controller 111A to the proximal (or the first) expander 116A-1, or indicates the first expander 116A-1 (or any of media drives 107-1-0 through 107-1-m). Also, k=n indicates the four-wide link 153A-n located at the lowermost stream or the nth expander 116A-n (or any of the media drives 107-n-0 through 107-n-m) located farthest from the SAS controller 111A (or located at the end of the cascade).

In step 102, the control program 116A selects one of the four phys #10 through #13 of the SAS controller 111A (selects phy#10, for example), and transmits, from the selected phy (phy#10, for example), a command that designates a target in which k=1 (the proximal expander 106A-1 or any of the media drives connected to the expander 106A-1). When transmission of this command succeeds and the SAS path failure is not detected during this command transmission (No in step 102), the control program 116A executes step 114. When the SAS path failure is detected again, the control program 116A changes the phy of the command transmission source and retransmits a command (i.e., selects another phy of the SAS controller 111A and retransmits, from the selected phy, the command designating a target in which k=1). The control program 116A repeats the above-described processing until the SAS path failure is no longer detected when using any selected phy. If the SAS path failure is detected even when the command is retransmitted from any phy, that is, if the SAS path failure is detected with respect to all four phys #10 through #13 (YES in step 102), the processing proceeds to step 103.

In step 103, the control program 116A causes the control program 116B to execute the same processing as step 102 in the second SAS signal path. Specifically, the control program 116B selects one phy from among four phys #10 through #13 of the SAS controller 111B, and transmits, from the selected phy, a command that designates a target in which k=1 (the proximal expander 106A-1 or any of the media drives connected to the expander 106A-1). When the SAS path failure is not detected (No in step 103), step 114 is executed. When the SAS path failure is detected, the control program 116B selects another phy and retransmits, from this phy, the command designating k=1. The control program 116B repeats the above-described processing until the SAS path failure is not detected when using any selected phy. If the SAS path failure is detected even when the command is retransmitted from any phy, that is, if the SAS path failure is detected with respect to all four phys #10 through #13 (YES in step 103), the processing proceeds to step 104 (at this moment, the control program 116B can notify the control program 116A of the result of the processing).

In step 104, the control program 116A (or the control program 116B) determines that a power source failure has occurred in the expansion enclosure 103-1. The reason is considered that both of the four-wide links 153A-1 and 153B-1 in which k=1 are not available because power is no longer supplied from both of the power sources 104A-1 and 104B-1 to both of the expanders 106A-1 and 106B-1 in the expansion enclosure 103-1.

However, even if a power source failure has occurred, it is unknown in step 104 whether this power source failure is a type of power source failure that can be restored in a short period of time (for example, a power source failure that is caused for a short period of time due to a brief blackout; this power source failure is referred to as "temporal power source failure" hereinafter) or a type of power source failure that requires a longer time to be restored than the temporal power source failure (for example, a power source failure whose failure occurrence location needs to be replaced, or a power source failure that is caused for a long period of time due to a long blackout; both power source failures are referred to as "normal power source failure" hereinafter). Therefore, which one of the power source failures has occurred is determined in the flow of the following processing.

Specifically, in step 105, the control program 116A retransmits the command designating a target in which k=1, from any phy selected from among the four phys #10 through #13 of the SAS controller 111A.

If this retransmission performed in step 105 succeeds (YES in step 106), the control program 116A determines that the temporal power source failure has occurred in the expansion enclosure 103-1 (step 107), and automatically restores the SAS controller 111A (step 108). Specifically, the SAS controller 111A is caused to execute initialization processing. In the initialization processing, for example, the SAS controller 111A transmits the discovery command for all of the phys of all of the expanders existing downstream, and thereby collects the destination information elements of the respective devices existing downstream, to construct the routing table. The control program 116A may write, into the memory 122A, the failure report information indicating that the temporal power source failure has occurred in the expansion enclosure 103-1, and may transmit the failure report information recorded in the memory 122A to the SVP 105 immediately or at any time (on a regular or irregular basis, for example).

If the retransmission performed in step 105 fails (NO in step 106), the control program 116A causes the control program 116B to retransmit the command designating a target in which k=1, from any phy selected from among the four phys #10 through #13 of the SAS controller 111B (step 109).

If this retransmission performed in step 109 succeeds (YES in step 110), the control program 116A determines that the SAS path failure has occurred in the four-wide link 153A-1 in which k=1 (step 111). The reason is that the power source failure is not caused by the detection of the SAS path failure that starts this failure check processing, since the command can be transmitted to a target in which k=1 by using the other four-wide link 153B-1.

If the retransmission performed in step 109 fails (NO in step 110), the control program 116A determines that the normal power source failure has occurred in the expansion enclosure 103-1, writes the failure report information indicating the occurrence of the normal power source failure to the memory 122A, and transmits the failure report information to the SVP 105 immediately or at any time (step 112). The reason that the occurrence of the normal power source failure is determined is because the power source failure determined in step 104 is the type of power source failure that is not restored until the retry is carried out in step 105 or step 109.

After step 112, the control program 116A waits for the recovery from the normal power source failure that has occurred in the expansion enclosure 103-1 (step 113), and the processing returns to step 102.

Substantially the same processings as those of the above-described steps 102 through 113 are sequentially performed for the downstream expansion enclosure 103-k, until the failure is specified as the SAS path failure in the first SAS signal path or the power source failure in the expansion enclosure. It should be noted that the k is an integer of p−1 or lower in the failure check processing. The reason is that p is value related to the position of the target of command transmission that is the cause of detection of the SAS path failure.

In step 114, the control program 116A sends a command designating a target in which k=k+1 (2, in this case) from any one of phy selected from among four phys #10 through #13 of an expander 106A-k of the expansion enclosure 103-k (k=1 in an initial state). When the SAS path failure is not detected (NO in step 114), k is incremented by 1 (step 117) if k=p−1 is not satisfied (NO in step 128), and step 114 is executed for the resulting incremented k. Even when k=p−1 is satisfied, when the SAS path failure is not detected, then it is considered that the expansion enclosure 103-k has already recovered from the failure (for example, it is considered that the expansion enclosure 103-k has already recovered from the power source failure in step 113 or 127).

If the SAS path failure is not detected in step 114, the control program 116A retransmits the command designating k=k+1 from another phy selected from among the four phys #10 through #13 of the expander 106A-k. The control program 116A repeats the above-described processing until the SAS path failure is no longer detected when using any of the phys. If the SAS path failure is detected even if the command is retransmitted from any of the phys, that is, if the SAS path failure is detected with respect to all of the four phys #10 through #13 (YES in step 114), the processing proceeds to step 115.

In step 115, the control program 116A causes the control program 116B to execute the same processing as that of step 114 with respect to the second SAS signal path. When the control program 116B does not detect the SAS path failure when using any phy selected from among the four phys #10 through #13 of an expander 106B-k (NO in step 115), if k=p−1 is satisfied (YES in step 116), the control program 116B determines that the SAS path failure related to the four-wide link 153A-p (i.e., k=k+1=p) has occurred (step 118). The reason is that the power source failure in the expansion enclosure 103-p is not caused by the detection of the SAS path failure that starts this failure check processing, since the command can be transmitted to a target in which k=p by using the other four-wide link 153B-p.

If k=p−1 is not satisfied after NO is obtained as a result of step 115 (NO in step 116), k is incremented by 1 (step 117), and then step 114 is executed for the resulting incremented k.

When, in step 115, the SAS path failure is detected in all of the four phys #10 through #13 of the expander 106B-k (YES in step 115), steps 119 through 127 that are the same as steps 105 through 113 respectively are executed.

Specifically, in step 119, the control program 116A retransmits the command designating a target in which k=k+1, from any phy selected from among the four phys #10 through #13 of the expander 106A-k.

If the retransmission performed in step 119 succeeds (YES in step 120), the control program 116A determines that the temporal power source failure has occurred in an expansion enclosure 103-(k+1) (step 121), and automatically restores the SAS controller 111A (step 122).

If the retransmission performed in step 119 fails (NO in step 120), the control program 116A causes the control program 116B to retransmit the command designating a target in which k=k+1, from any phy selected from among the four phys #10 through #13 of the expander 106B-k (step 123).

If the retransmission performed in step 123 succeeds (YES in step 124), the control program 116A determines that the SAS path failure related to the four-wide link 153A-k has occurred (step 125).

If the retransmission performed in step 123 fails (NO in step 124), the control program 116A determines that the normal power source failure has occurred in the expansion enclosure 103-(k+1), writes the failure report information indicating the occurrence of the normal power source failure to the memory 122A, and transmits the failure report information to the SVP 105 immediately or at any time (step 126).

After step 126 is performed, the control program 116A waits for the recovery from the normal power source failure that has occurred in the expansion enclosure 103-(k+1) (step 127), and the processing returns to step 102.

If it is determined in the above-described failure check processing that the normal power source failure has occurred, the failure report information indicating that the normal power source failure has occurred is transmitted to the SVP 105 by the control program 116A. For example, in step 112, the control program 116 transmits, to the SVP 105, the failure report information indicating that the normal power source failure has occurred in the expansion enclosure 103-1, as shown in FIG. 4A. The SVP 105 accumulates the failure report information in the unshown storage resource within the SVP 105, and displays a failure report screen 1051 on the basis of the accumulated failure report information. On the failure report screen 1051, objects representing the power sources 104A-1 and 104B-1 within the expansion enclosure 103-1 are displayed with emphasis (for example, the colors within these objects blink).

Moreover, as shown in FIG. 4B, the SVP 105 transmits the SIM having the error code indicating the normal power source failure and information indicating the expansion enclosure 103-1 to the maintenance center device 131, on the basis of the accumulated failure report information. The maintenance center device 131 displays, on the basis of the SIM, information that indicates whether or not the normal power source failure has occurred in the expansion enclosure 103-1.

According to the first embodiment described above, the power source abnormality reporting cable is not required (in other words, a path for transmitting the failure report information can be used together with a path for transferring data exchanged between the media drives and the controller 112A). Therefore, it is expected that wirings can be easily formed in the expansion enclosure. Furthermore, a special circuit for receiving a notification of a power source failure via the power source abnormality reporting cable is not required.

In addition, according to the first embodiment described above, the power source abnormality detection circuit is not required. Therefore, power consumption can be reduced.

Furthermore, as described above, since the power source abnormality reporting cable and the power source abnormality detection circuit are not required, the number of parts can be reduced, whereby the number of targets to be maintained (or inspected, for example) can be reduced. Therefore, it is expected that the frequency of replacement of the parts or the frequency of occurrence of faulty wiring can be lowered.

As described above, according to the first embodiment, neither the power source abnormality detection circuit nor the power source abnormality reporting cable is required, but it is difficult to simply apply this embodiment to a storage system in which media drives are connected to FC-ALs extending throughout a plurality of expansion enclosures (referred to as "FC-AL storage system" hereinafter). The reason is that, in a FC-AL, if a failure occurs in a certain section on the FC-AL (a media drive, for example), all of the media drives that are connected to this FC-AL (the media drives in each of the plurality of expansion enclosures) cannot be accessed via this FC-AL. In other words, if the power source abnormality detection circuit or the power source abnormality reporting cable are removed from the FC-AL storage system, the cause of inaccessibility to the media drives cannot be determined (it is impossible to specify whether the cause of inaccessibility is the occurrence of a power source failure in the expansion enclosures or the occurrence of a failure on the FC-AL).

Therefore, in the first embodiment, the storage system 1001 in which the media drives are connected to the expanders connected in the form of a cascade is adopted in place of the FC-AL, according to the SAS standard. According to the SAS standard, even if a failure occurs in a certain phy that connects the expanders, a desired media drive can be accessed by using another phy that connects the expanders. Specifically, even if a failure occurs in a certain phy that connects the expanders or in a media drive connected to the expanders, all of the media drives connected in the form of a cascade can be accessed, unlike the FC-AL.

In the first embodiment, by performing the above-described failure check processing using the characteristics of the SAS, the cause of detection of the SAS path failure can be determined (it is possible to specify whether the cause is a power source failure or a simply the SAS path failure (e.g., a trouble in the expanders)). Therefore, the occurrence of a power source failure can be discovered even without the power source abnormality detection circuit or the power source abnormality reporting cable as described above.

Second Embodiment

The second embodiment of the present invention is described hereinafter. In such case, the differences with the first embodiment are mainly described, and descriptions of the similarities with the first embodiment are omitted or simplified (the same applies to a third embodiment and the subsequent embodiments described hereinafter).

Figure 5:
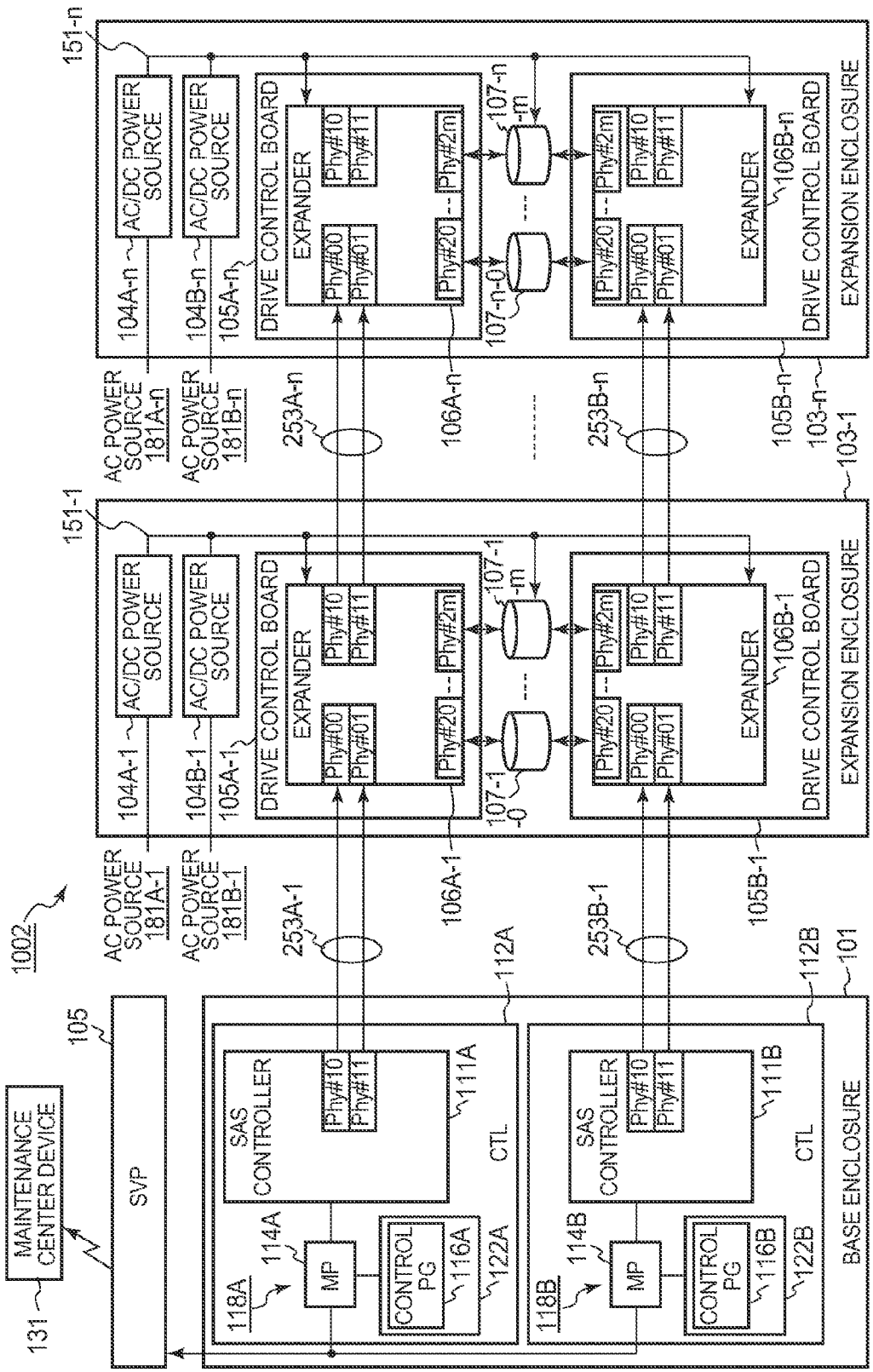
FIG. 5 shows an example of the configuration of a storage system according to a second embodiment of the present invention.

FIG. 5 shows an example of the configuration of a storage system according to the second embodiment of the present invention. In FIG. 5, the same numbers are applied to the elements that are substantially the same as those shown in FIG. 2 (the same applies to the third embodiment and the subsequent embodiments described hereinafter).

According to a storage system 1002, a wide link that connects the SAS controller 111A (and 111B) and the expander 106A-1 (and 106B-1) to each other and a wide link that connects the expanders each are a two-wide link. The two-wide link is a collection of two narrow links that connect two-wide ports (a collection of two phys).

Figure 6:
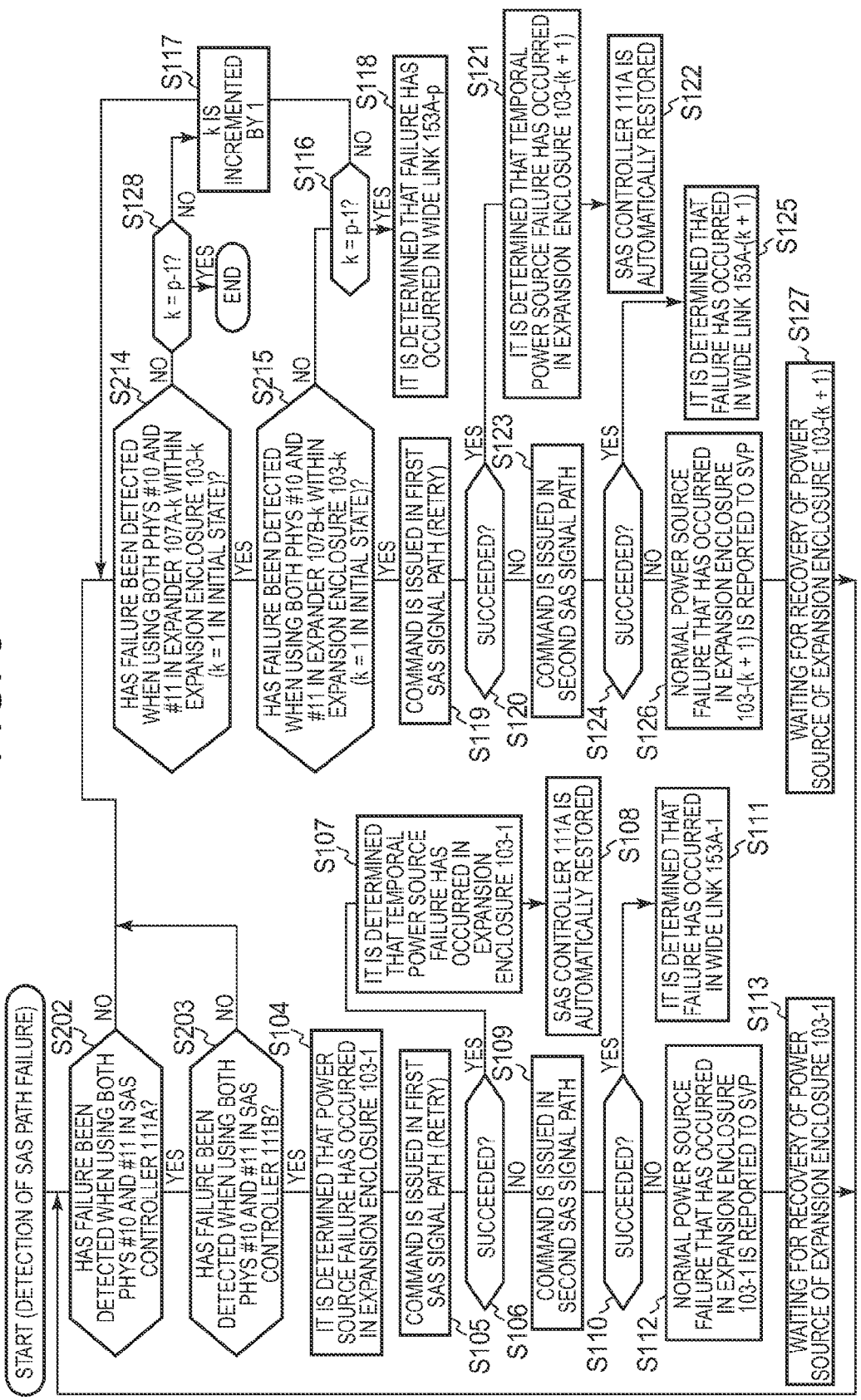
FIG. 6 shows a flow of failure check processing performed in the second embodiment of the present invention.

FIG. 6 shows a flow of failure check processing performed in the second embodiment of the present invention.

In the second embodiment, since the two-wide link is adopted in place of the four-wide link, steps 202, 203, 214 and 215 are performed in place of steps 102, 103, 114 and 115 shown in FIG. 3. Specifically, it is determined whether or not the SAS path failure is detected in all of the two phys #10 and #11 instead of the four phys #10 through #13.

Third Embodiment

Figure 7:
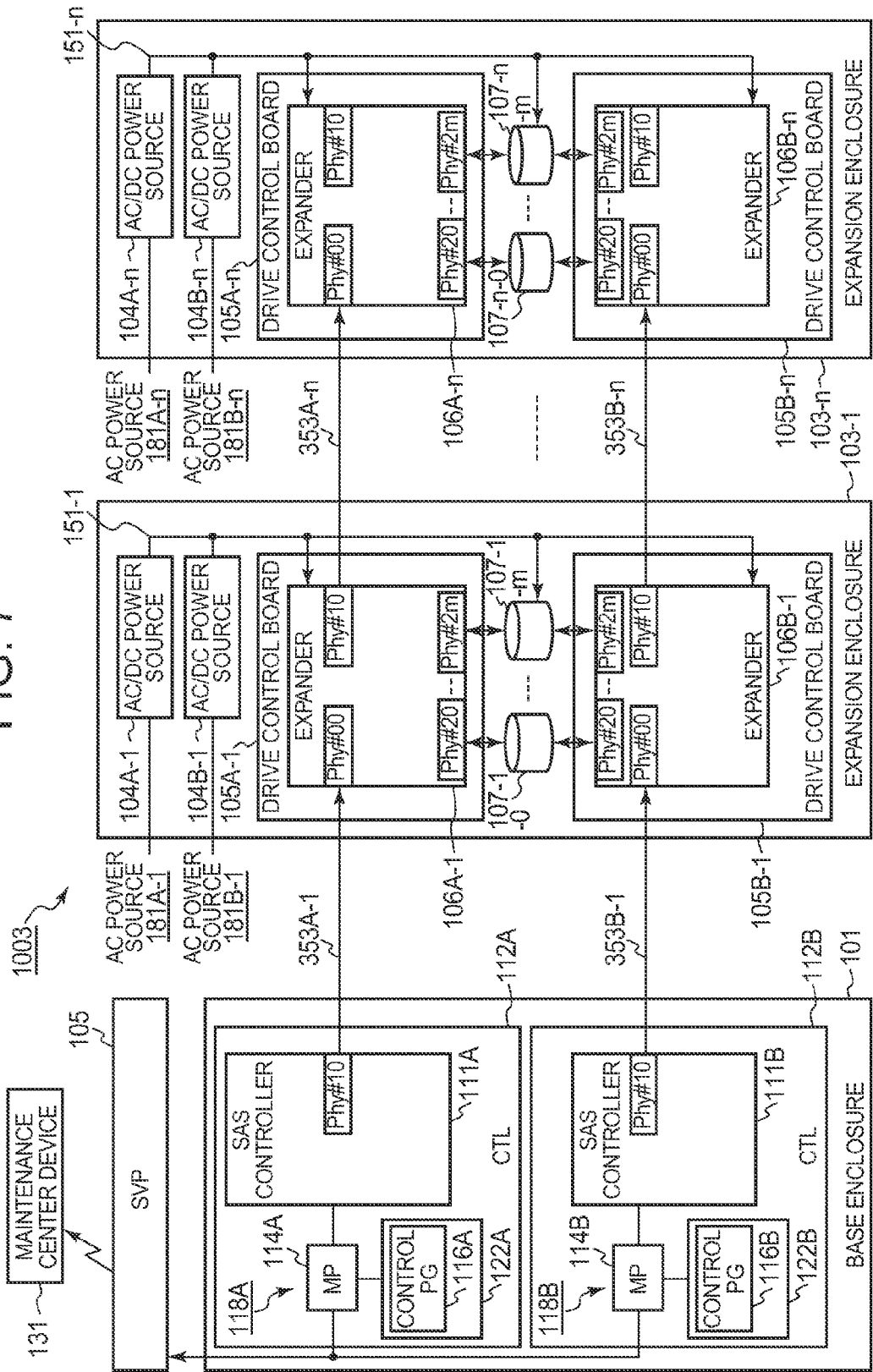
FIG. 7 shows an example of the configuration of a storage system according to a third embodiment of the present invention.

FIG. 7 shows an example of the configuration of a storage system according to the third embodiment of the present invention.

According to a storage system 1003, a link that connects the SAS controller 111A (and 111B) and the expander 106A-1 (and 106B-1) to each other and a link that connects the expanders each are not the four-wide link but a single narrow link.

Figure 8:
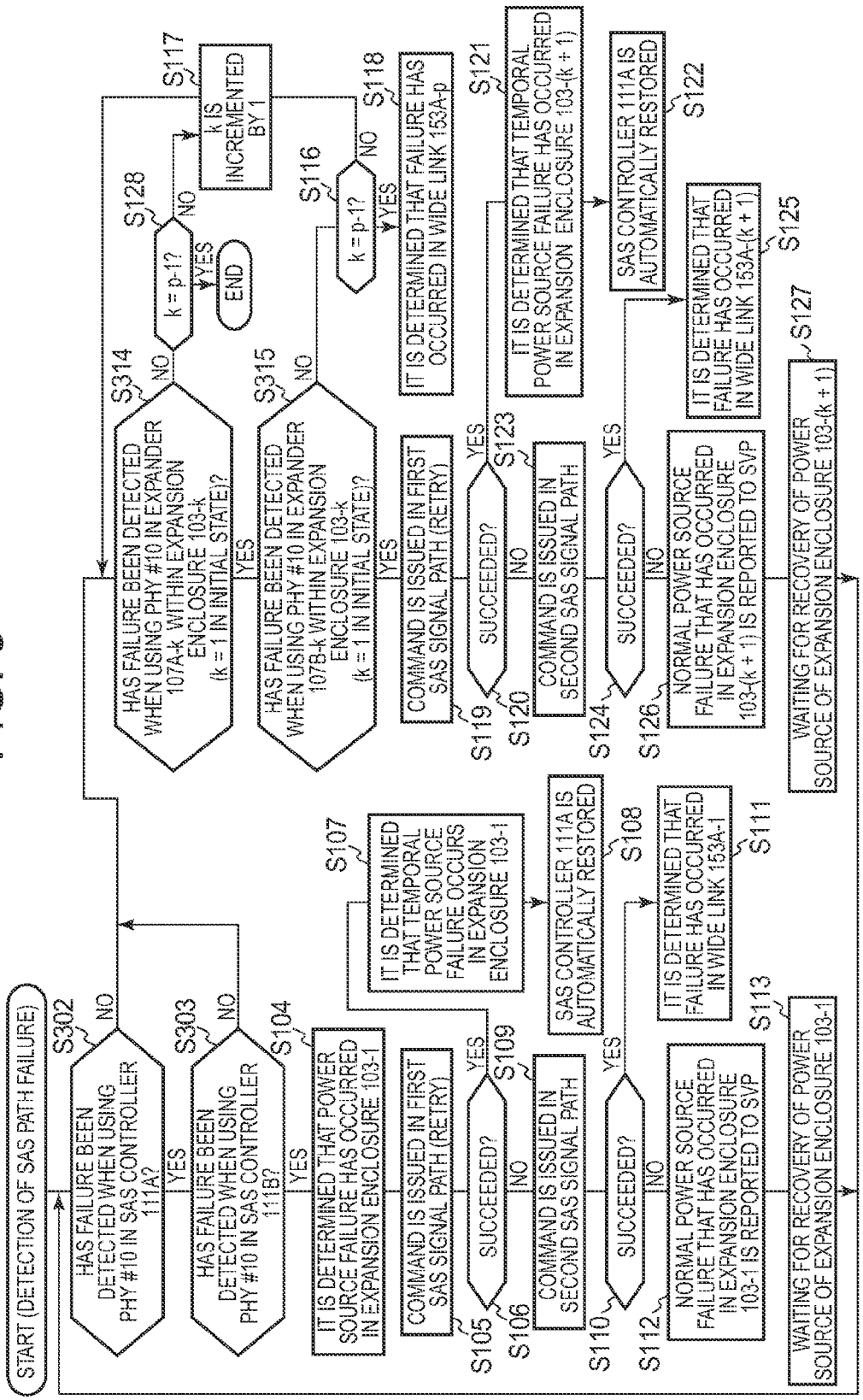
FIG. 8 shows a flow of failure check processing performed in the third embodiment of the present invention.

FIG. 8 shows a flow of failure check processing performed in the third embodiment of the present invention.

In the third embodiment, since a narrow link is adopted in place of the four-wide link, steps 302, 303, 314 and 315 are performed in place of steps 102, 103, 114 and 115 shown in FIG. 3. Specifically, it is determined whether or not the SAS path failure is detected in one phy #10 instead of the four phys #10 through #13.

Fourth Embodiment

Figure 9:
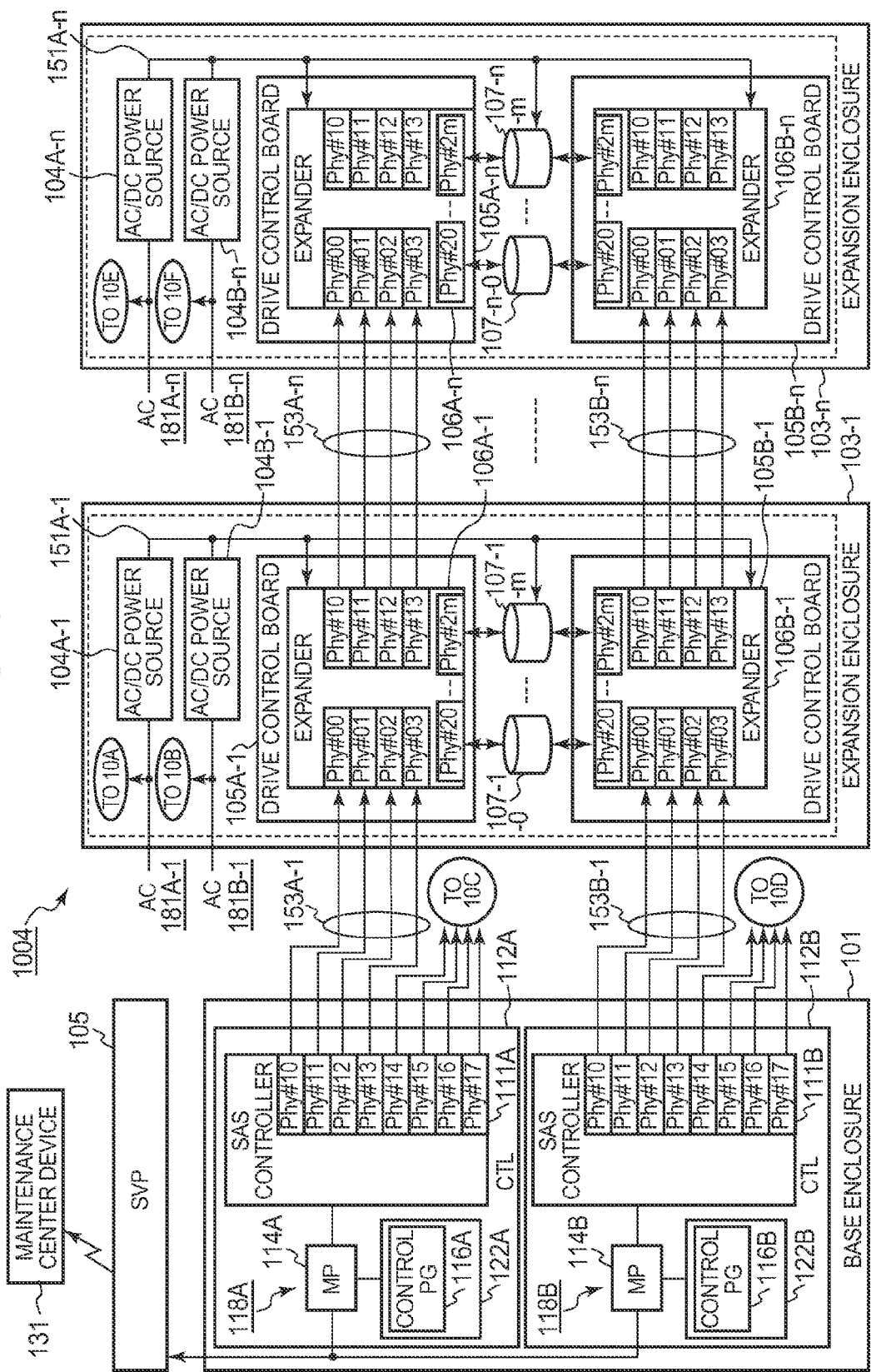
FIG. 9 shows a part of an example of the configuration of a storage system according to a fourth embodiment of the present invention.
Figure 10:
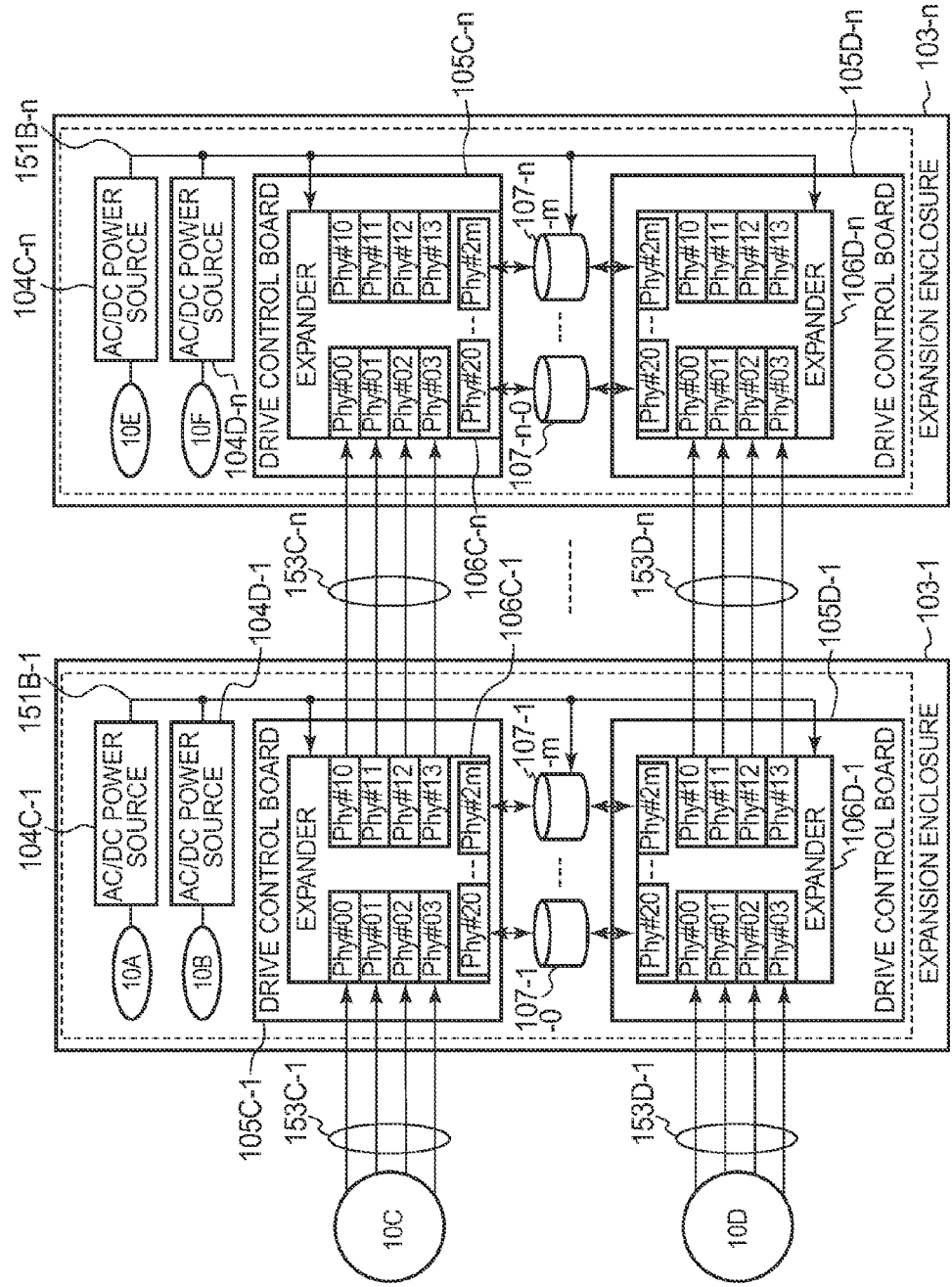
FIG. 10 shows a part of the rest of the configuration example of the storage system.

FIG. 9 and FIG. 10 each show an example of the configuration of a storage system according to the fourth embodiment of the present invention. Specifically, FIG. 9 shows a part of the configuration example of the storage system according to the fourth embodiment, and FIG. 10 shows a part of the rest of the configuration example of the storage system according to the fourth embodiment.

In a storage system 1004, the configurations illustrated in the first embodiment are made redundant to configure the expansion enclosures 103-1 through 103-n as shown in the dotted frames shown in FIG. 9 and FIG. 10. Specifically, for example, the expansion enclosure 103-n has expanders 106C-n and 106D-n in addition to the expanders 106A-n and 106B-n, and power sources 104C-n and 104D-n in addition to the power sources 104A-n and 104B-n. Power is supplied from the power sources 104C-n and 104D-n to the expanders 106C-n and 106D-n. The RAID group is configured by one or more media drives shown in one of the dotted frames and one or more media drives shown in the other dotted frame.

The first SAS signal path and the second SAS signal path are made redundant. Specifically, the SAS controller 111A has eight phys #10 through #17. The first SAS signal path is connected to one four-wide port (a collection of four phys #10 through #13) of these eight phys, and a third SAS signal path is connected to another four-wide port (a collection of four phys #14 through #17). Similarly, the SAS controller 111B has eight phys #10 through #17. The second SAS signal path is connected to one four-wide port (a collection of four phys #10 through #13) of these eight phys, and a fourth SAS signal path is connected to another four-wide port (a collection of four phys #14 through #17). The third SAS signal path is configured by four-wide links 153C-1 through 153C-n and the expanders 106C-1 through 106C-n, and the fourth SAS signal path is configured by four-wide links 153D-1 through 153D-n and the expanders 106D-1 through 106D-n.

Figure 11:
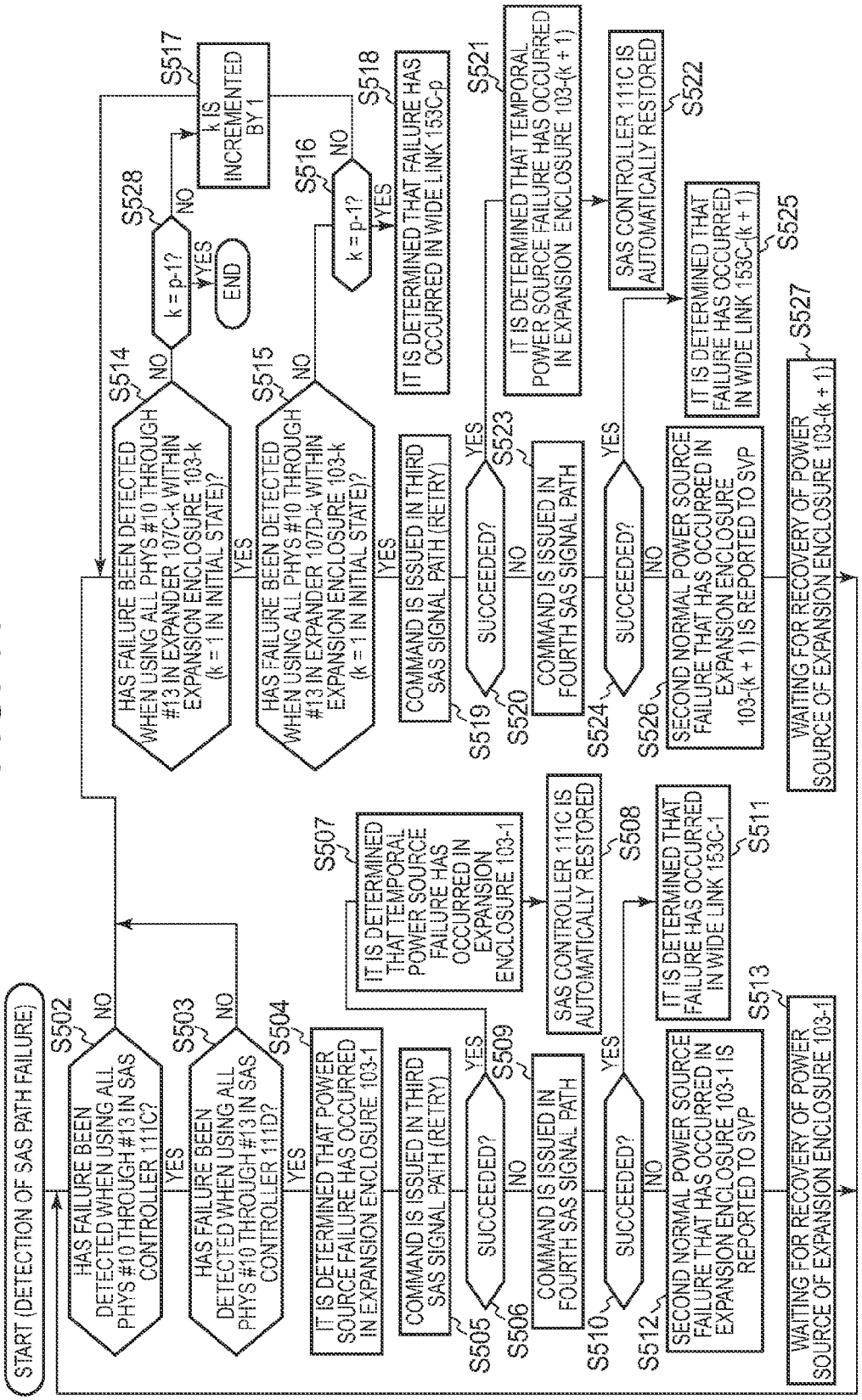
FIG. 11 shows a flow of failure check processing performed when a SAS path failure is detected by a third SAS signal path in the fourth embodiment of the present invention.

In the third embodiment, when the SAS path failure is detected in the first SAS signal path, the control program 116A executes the steps following step 102 shown in FIG. 3. When the SAS path failure is detected in the third SAS signal path, the control program 116A executes the steps following step 502 shown in FIG. 11. Steps 502 through 528 shown in FIG. 11 correspond to steps 102 through 128 shown in FIG. 3, respectively. The difference is that FIG. 11 illustrates a flow of processings for the third and fourth SAS signal paths, while FIG. 3 illustrates a flow of processings for the first and second SAS signal paths. Furthermore, in the present embodiment, it can be distinguished whether a failure is a power source failure that is caused by failures of both the power sources 104A (104-n, for example) and 104B (104B-n, for example) ("first power source failure" hereinafter) or a power source failure that is caused by failures of both the power sources 104C (104C-n, for example) and 104D (104D-n, for example) ("second power source failure" hereinafter). Specifically, for example, when the normal power source failure is found in the expansion enclosure 103-n with respect to the first and second SAS signal paths, the control program 116A includes, into the failure report information, the fact that this normal power source failure is the first normal power source failure caused by the failures of both the power sources 104A-n and 104B-n. When the normal power source failure is found in the expansion enclosure 103-n with respect to the third and fourth SAS signal paths, the control program 116A includes, into the failure report information, the fact that this normal power source failure is the second normal power source failure caused by the failures of both the power sources 104C-n and 104D-n.

Fifth Embodiment

Figure 12:
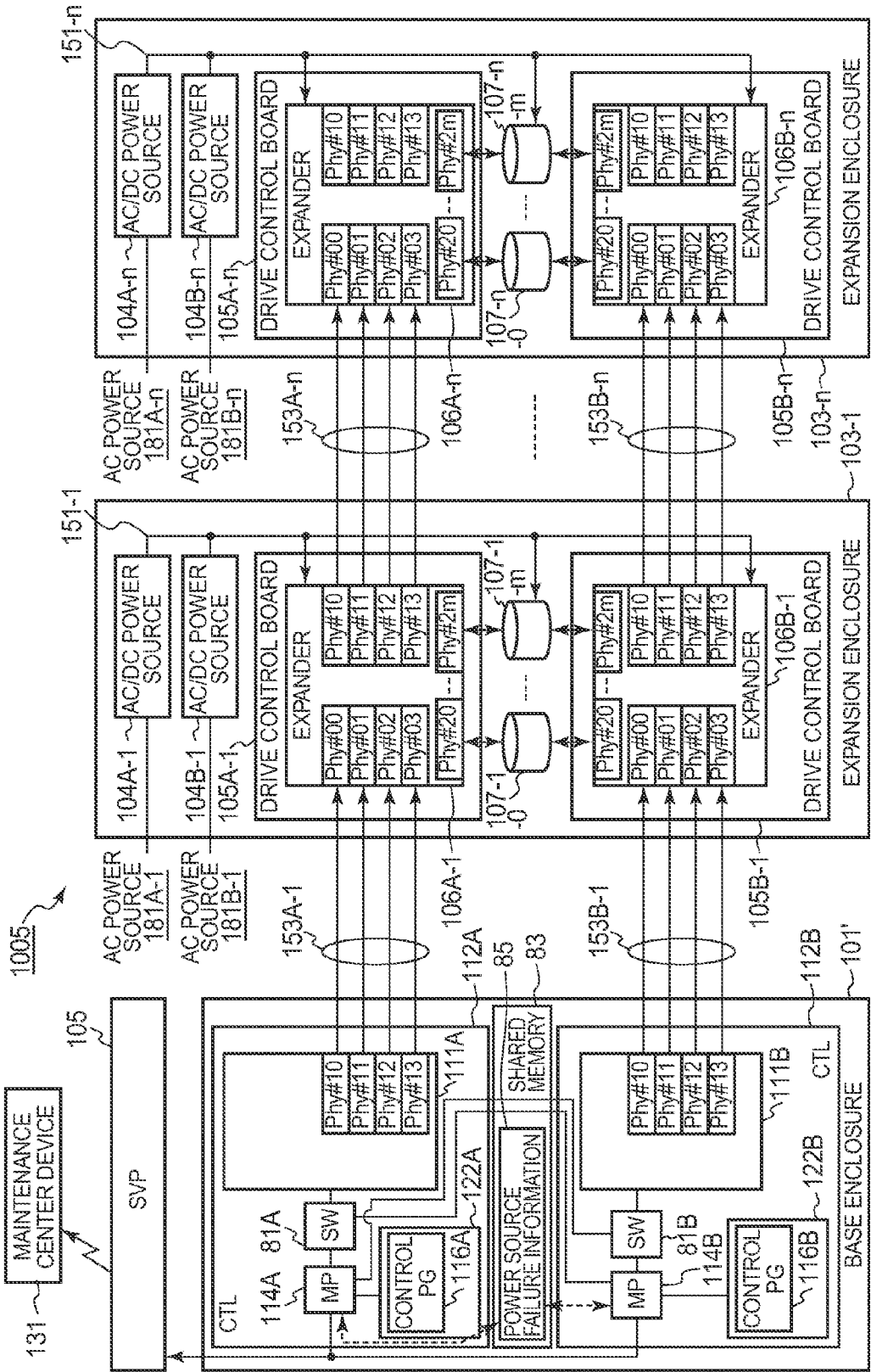
FIG. 12 shows an example of the configuration of a storage system according to a fifth embodiment of the present invention.

FIG. 12 shows an example of the configuration of a storage system according to the fifth embodiment of the present invention.

According to a storage system 1005, a switch device 81A (and 81B) is interposed between the MP 114A (and 114B) and the SAS controller 111A (and 111B) in the controller 112A (and 112B). The first switch device 81A is connected to the second MP 114B and the second switch device 81B is connected to the first MP 114A. Therefore, the first MP 114A, for example, can issue a command to the first SAS controller 111A via the first switch device 81A and can also issue a command to the second SAS controller 111B via the second switch device 81B.

The base enclosure 101 is equipped with a shared memory 83 that is shared by the two controllers 112A and 112B. When either one of the control programs 116A and 116B finds the occurrence of the normal power source failure during the failure check processing, the shared memory 83 is caused to record power source failure information 85 that indicates at which level k of the expansion enclosure 103-k the normal power source failure has occurred. When the SAS path failure is detected, the other one of the control programs 116A and 116B checks whether or not the power source failure information 85 is recorded in the shared memory 83 before starting the failure check processing, and, if recorded, waits for the recovery from the normal power source failure that has occurred in the expansion enclosure 103-k corresponding to the level k indicated by the power source failure information 85, without performing the failure check processing.

Figure 13:
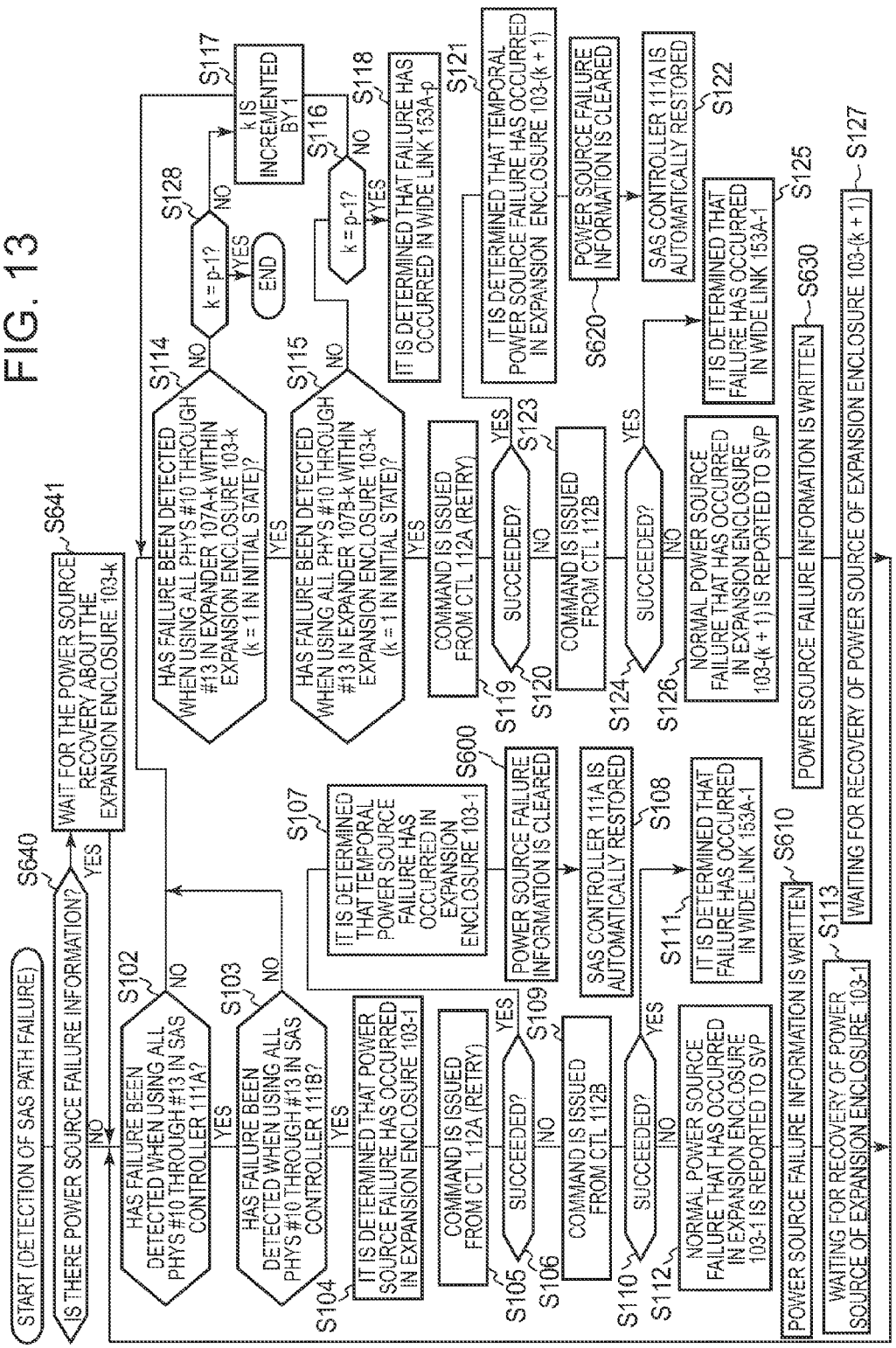
FIG. 13 shows a flow of processing performed when a SAS path failure is detected according to the fifth embodiment of the present invention.

FIG. 13 shows a flow of processing performed when the SAS path failure is detected according to the fifth embodiment of the present invention.

When the SAS path failure is detected, the control program 116A checks whether or not the power source failure information 85 is recorded in the shared memory 83 (step 640). If it is determined that the power source failure information 85 is recorded (YES in step 640), the control program 116A executes step 641 (waits for the recovery from the normal power source failure that has occurred in the expansion enclosure 103-k corresponding to the level k indicated by the power source failure information 85). If it is determined that the power source failure information 85 is not recorded, the control program 116A performs processing subsequent to step 102.

In steps 103, 109, 115 and 123, not the control program 116B but the control program 116A issues a command from the SAS controller 111B via the second switch 81B.

Also, the control program 116A clears (deletes, for example) the power source failure information 85 after (or subsequent to) steps 107 and 121 (steps 600 and 620).

Moreover, after (or subsequent to) steps 112 and 126, the control program 116A writes the power source failure information 85 that indicates that the normal power source failure has occurred in the expansion enclosure 103-k (k=1 in step 112, and k=n in step 126) (steps 610 and 630).

Several embodiments of the present invention were described above, but these embodiments are merely examples to describe the present invention, and the scope of the present invention is not limited by these embodiments. The present invention can be implemented by various other embodiments.

For example, regarding a K-wide link (K is an integer of 2 or more), the above has described the examples where K is 4 and 2, but K may be other integers.

Furthermore, for example, in the above embodiments a plurality of expanders corresponding to a plurality of levels respectively may be provided in one expansion enclosure (specifically, the expansion enclosure 103-1, for example, may have the expanders 106A-2 and 106B-2 in addition to the expanders 106A-1 and 106B-1). In this case, in the expansion enclosure, a pair of power sources 104A and 104B may supply power to a pair of expanders 106A and 106B or to a plurality of pairs of expanders 106A and 106B. Also, in this case, the memories 122A and 122B may store information that indicates which expander is supplied with power from a power source provided in any expansion enclosure ("power source management information" hereinafter). When the control programs 116A and 116B fail in transmission of a command from, for example, all of the phys #10 through #13 of the kth expander to the (k+1)th expander, the control programs 116A and 116B may refer to the power source management information to specify which pair of power sources supply power to the (k+1)th expander and which expansion enclosure is provided with this pair of power sources, and may transmit the failure report information indicating in which pair of power sources of an expansion enclosure the failure has occurred.

Moreover, for example, the expanders may control which phy to use to transmit a command to a downstream expander, on the basis of the ID (World Wide Name (WWN), for example) of the phy which is specified from a command transmitted from the upstream side and through which this command is transmitted.

In addition, for example, in each of the embodiments described above, automatic restoration may be performed not only on the SAS controller 111A but also on the SAS controller 111B. In a method for this automatic restoration, for example, the SAS controller 111A and/or the SAS controller 111B transmits the discovery command from its phy on a regular basis (or retries the transmission if the transmission fails), and if the transmission succeeds, the SAS controller 111A and/or the SAS controller 111B can be restored in units of how the phys are disposed.

What is claimed is:

1. A storage system comprising:
  a base enclosure including a first controller;
  an expansion enclosure including a first switch, one or more storage devices coupled to the first switch; and
  a plurality of first links between the first controller and the first switch;
  wherein the first controller is configured to perform transmission of a command targeted to the one or more storage devices via each of the first links,
  wherein if the transmission of the command fails via all of the first links, the first controller is configured to determine that a failure occurs in the expansion enclosure, and wherein the transmission of the command and the determining of the failure are done from the controller side of the storage system, and determining an enclosure, including SAS expander, that fails in the transmission of the command because of a power source failure of the enclosure.

2. The storage system according to claim 1, wherein if the transmission of the command fails via part of the first links, the controller is configured to determine that a failure occurs on the part of the first links.

3. The storage system according to claim 1, wherein the first switch is a first SAS expander.

4. The storage system according to claim 1, wherein, in response to the determination that the failure has occurred in the expansion enclosure, the first controller transmits a failure report that indicates the failure to a SVP (Service Processor).

5. The storage system according to claim 1, wherein the first controller writes information related to the failure in the expansion enclosure to a memory.

6. The storage system according to claim 1, wherein the first controller transmits the command targeted to the storage device via each of the first links in response to a failure of a drive I/O command from the first controller targeted to a storage device from the one or more storage devices.

7. The storage system according to claim 1, wherein
the first controller transmits a drive I/O command to a storage device from the one or more storage devices;
if transmission has failed for the drive I/O command transmitted by the first controller, the first controller determines whether failure information is stored in a memory; and
the first controller transmits the command targeted to the storage device via each of the first links if the failure information is not stored in the memory.

8. The storage system according to claim 1, wherein
the first controller includes a first SAS (Serial Attached SCSI) controller that includes one or more physical ports;
the first switch is a SAS interface circuit that includes physical ports;
the links in the plurality of first links are implemented as links from the physical ports in the first SAS controller to the physical ports in the first switch.

9. The storage system according to claim 8, wherein the one or more physical ports in the first SAS controller consist of four physical ports, the links from the plurality of first links consist of four links, and each link from the first links is implemented as a single narrow link between one of the physical ports in the first SAS controller and one of the physical ports in the first switch.

10. The storage system accordingly to claim 8, wherein the one or more physical ports in the first SAS controller consist of four physical ports, the links from the plurality of first links consist of two links, and each link from the first links is implemented as a two-wide link between two of the physical ports in the first SAS controller and two of the physical ports in the first switch.

11. A method for use in a storage system for detecting occurrence of a power failure, the method comprising:
providing a base enclosure including a first controller;
providing an expansion enclosure including a first switch, and one or more storage devices coupled to the first switch;
providing a plurality of first links between the first controller and the first switch;
the first controller transmitting a command targeted to the one or more storage devices via each of the first links, and
if the transmission of the command fails via all of the first links, the first controller determining that a failure occurs in the expansion enclosure, and wherein the transmission of the command and the determining of the failure are done from the controller side of the storage system, and determining an enclosure, including SAS expander, that fails in the transmission of the command because of a power source failure of the enclosure.

12. The method according to claim 11, wherein if the transmission of the command fails via part of the first links, the controller determining that a failure occurs on the part of the first links.

13. The method according to claim 11, wherein the first switch is a first SAS expander.

14. The method according to claim 11, wherein, in response to the determining that the failure has occurred in the expansion enclosure, the first controller portion transmitting a failure report that indicates the power source failure to a SVP (Service Processor).

15. The method according to claim 11, wherein the first controller writing information related to the failure in the expansion enclosure to a memory.

16. The method according to claim 11, wherein the first controller portion transmitting the command targeted to the storage device via each of the first links in response to a failure of a drive I/O command from the first controller targeted to a storage device from the one or more storage devices.

17. The method according to claim 11, wherein
the first controller transmitting a drive I/O command to a storage device from the one or more storage devices;
if transmission has failed for the drive I/O command transmitted by the first controller, the first controller determining whether failure information is stored in a memory; and
the first controller transmitting the command targeted to the storage device via each of the first links if the failure information is not stored in the memory.

18. The method according to claim 11, wherein
the first controller includes a first SAS (Serial Attached SCSI) controller that includes one or more physical ports;
the first switch is a SAS interface circuit that includes physical ports; and
the links in the plurality of first links are implemented as links from the physical ports in the first SAS controller to the physical ports in the first switch.

19. The method according to claim 18, wherein the one or more physical ports in the first SAS controller consist of four physical ports, the links from the plurality of first links consist of four links, and each link from the first links is implemented as a single narrow link between one of the physical ports in the first SAS controller and one of the physical ports in the first switch.

20. The method according to claim 18, wherein the one or more physical ports in the first SAS controller consist of four physical ports, the links from the plurality of links consist of two links, and each link from the first links is implemented as a two-wide link between two of the physical ports in the first SAS controller and two of the physical ports in the first switch.

* * * * *